(12) United States Patent
Saito

(10) Patent No.: US 12,699,933 B2
(45) Date of Patent: *Aug. 4, 2026

(54) METHODS AND SYSTEMS FOR ALERTING USERS REGARDING AVAILABILITY OF UNCONSUMED CONTENT

(71) Applicant: Adeia Guides Inc., San Jose, CA (US)

(72) Inventor: Sakura Saito, Tokyo (JP)

(73) Assignee: Adeia Guides Inc., San Jose, CA (US)

( * ) Notice: Subject to any disclaimer, the term of this patent is extended or adjusted under 35 U.S.C. 154(b) by 101 days.

This patent is subject to a terminal disclaimer.

(21) Appl. No.: 18/655,987

(22) Filed: May 6, 2024

(65) Prior Publication Data

US 2024/0297925 A1    Sep. 5, 2024

Related U.S. Application Data

(63) Continuation of application No. 17/858,264, filed on Jul. 6, 2022, now Pat. No. 12,010,193, which is a
(Continued)

(51) Int. Cl.
*H04L 29/08* (2006.01)
*G06F 21/10* (2013.01)
(Continued)

(52) U.S. Cl.
CPC ............. *G06Q 10/00* (2013.01); *G06F 21/10* (2013.01); *G06Q 10/02* (2013.01); *G06Q 30/02* (2013.01); *G06Q 30/0207* (2013.01); *G06Q 30/0224* (2013.01); *H04L 65/612* (2022.05); *H04L 67/02* (2013.01); *H04L 67/10* (2013.01); *H04L 67/52* (2022.05); *H04L 67/535* (2022.05); *H04L 67/55* (2022.05); *H04L 67/60* (2022.05);
(Continued)

(58) Field of Classification Search
CPC ......... H04L 67/01; H04L 67/02; H04L 67/10; H04L 67/35; H04L 67/52; H04L 67/55; H04L 67/60; H04L 65/612; G06F 21/10; G06Q 10/00; G06Q 10/02; G06Q 30/02; H04N 21/2543; H04N 21/2743; H04N 21/44204; H04N 21/4438; H04N 21/4524; H04N 21/4583; H04N 21/5627; H04N 21/47217; H04N 21/4882; H04N 21/6125; H04N 21/6175; H04N 21/8456
USPC ........................................................ 709/206
See application file for complete search history.

(56) References Cited

U.S. PATENT DOCUMENTS 6,239,794 B1    5/2001  Yuen et al.
6,388,714 B1    5/2002  Schein et al.
(Continued)

FOREIGN PATENT DOCUMENTS

CN    102695082 A    9/2012
CN    102802040 A    11/2012
KR    102385663 B1   4/2022

*Primary Examiner* — Glenford J Madamba
(74) *Attorney, Agent, or Firm* — HG LAW LLP

(57) ABSTRACT

Methods and systems are described for a media guidance application that limits the incentive for authorized users to share content with unauthorized users, while still allowing users to access content virtually anywhere. Specifically, the media guidance application allows an authorized user to receive only a portion of a media asset that he or she is authorized to access on a different device, after a designated time period, and/or when the remaining portion of the media asset is inaccessible.

18 Claims, 8 Drawing Sheets

200

Related U.S. Application Data continuation of application No. 17/234,110, filed on Apr. 19, 2021, now Pat. No. 11,412,055, which is a continuation of application No. 16/654,923, filed on Oct. 16, 2019, now Pat. No. 11,019,165, which is a continuation of application No. 15/196,938, filed on Jun. 29, 2016, now Pat. No. 10,484,494.

(51) Int. Cl.

| | | |
|---|---|---|
| *G06Q 10/00* | (2023.01) | |
| *G06Q 10/02* | (2012.01) | |
| *G06Q 30/02* | (2023.01) | |
| *G06Q 30/0207* | (2023.01) | |
| *H04L 65/612* | (2022.01) | |
| *H04L 67/02* | (2022.01) | |
| *H04L 67/10* | (2022.01) | |
| *H04L 67/50* | (2022.01) | |
| *H04L 67/52* | (2022.01) | |
| *H04L 67/55* | (2022.01) | |
| *H04L 67/60* | (2022.01) | |
| *H04N 21/24* | (2011.01) | |
| *H04N 21/254* | (2011.01) | |
| *H04N 21/2543* | (2011.01) | |
| *H04N 21/258* | (2011.01) | |
| *H04N 21/2743* | (2011.01) | |
| *H04N 21/414* | (2011.01) | |
| *H04N 21/4335* | (2011.01) | |
| *H04N 21/442* | (2011.01) | |
| *H04N 21/443* | (2011.01) | |
| *H04N 21/45* | (2011.01) | |
| *H04N 21/458* | (2011.01) | |
| *H04N 21/4627* | (2011.01) | |
| *H04N 21/472* | (2011.01) | |
| *H04N 21/488* | (2011.01) | |
| *H04N 21/61* | (2011.01) | |
| *H04N 21/845* | (2011.01) | |
| *H04N 21/262* | (2011.01) | |
| *H04N 21/462* | (2011.01) | |
| *H04N 21/6587* | (2011.01) | |

(52) U.S. Cl.

CPC ..... *H04N 21/2407* (2013.01); *H04N 21/2541* (2013.01); *H04N 21/2543* (2013.01); *H04N 21/25808* (2013.01); *H04N 21/25825* (2013.01); *H04N 21/25833* (2013.01); *H04N 21/25866* (2013.01); *H04N 21/2743* (2013.01); *H04N 21/41422* (2013.01); *H04N 21/4335* (2013.01); *H04N 21/44204* (2013.01); *H04N 21/4424* (2013.01); *H04N 21/4432* (2013.01); *H04N 21/4438* (2013.01); *H04N 21/4524* (2013.01); *H04N 21/4583* (2013.01); *H04N 21/4627* (2013.01); *H04N 21/47217* (2013.01); *H04N 21/4882* (2013.01); *H04N 21/6125* (2013.01); *H04N 21/6175* (2013.01); *H04N 21/8456* (2013.01); *H04N 21/26283* (2013.01); *H04N 21/462* (2013.01); *H04N 21/47202* (2013.01); *H04N 21/6587* (2013.01)

(56) References Cited

U.S. PATENT DOCUMENTS

| | | | |
|---|---|---|---|
| 6,564,378 | B1 | 5/2003 | Satterfield et al. |
| 6,756,997 | B1 | 6/2004 | Ward et al. |
| 7,165,098 | B1 | 1/2007 | Boyer et al. |
| 7,761,892 | B2 | 7/2010 | Ellis et al. |
| 8,046,801 | B2 | 10/2011 | Ellis et al. |
| 9,351,025 | B1 | 5/2016 | Maughan et al. |
| 11,412,055 | B2 | 8/2022 | Saito |
| 2002/0174430 | A1 | 11/2002 | Ellis et al. |
| 2003/0110499 | A1 | 6/2003 | Knudson et al. |
| 2004/0024688 | A1 | 2/2004 | Bi et al. |
| 2005/0251827 | A1 | 11/2005 | Ellis et al. |
| 2007/0067301 | A1 | 3/2007 | Malik |
| 2010/0154021 | A1* | 6/2010 | Howarter ........... H04N 21/4331 |
| | | | 386/241 |
| 2011/0046755 | A1 | 2/2011 | Sung et al. |
| 2013/0117354 | A1 | 5/2013 | Lesser |
| 2014/0244104 | A1 | 8/2014 | Tan |
| 2014/0281976 | A1 | 9/2014 | Chia et al. |
| 2014/0380379 | A1 | 12/2014 | Klappert et al. |
| 2015/0163269 | A1 | 6/2015 | Ryu |
| 2015/0324858 | A1 | 11/2015 | Demattei |
| 2015/0350590 | A1 | 12/2015 | Micewicz |
| 2015/0350709 | A1* | 12/2015 | Tomita ................. H04N 21/462 |
| | | | 725/32 |
| 2015/0350746 | A1 | 12/2015 | Tomita |
| 2016/0007238 | A1 | 1/2016 | Salkintzis |
| 2016/0057489 | A1 | 2/2016 | He et al. |
| 2016/0126776 | A1 | 5/2016 | Kim et al. |
| 2017/0302976 | A1 | 10/2017 | Puttagunta et al. |
| 2021/0258395 | A1 | 8/2021 | Saito |
| 2023/0035604 | A1 | 2/2023 | Saito |

* cited by examiner

300

400

500

600

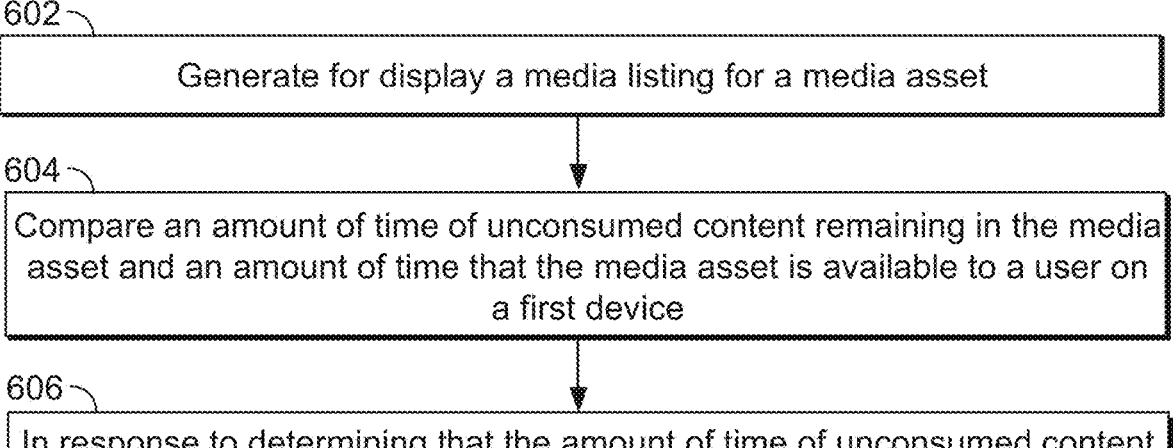

602

Generate for display a media listing for a media asset

604

Compare an amount of time of unconsumed content remaining in the media asset and an amount of time that the media asset is available to a user on a first device

606

In response to determining that the amount of time of unconsumed content remaining in the media asset exceeds the amount of time that the media asset is available to the user on the first device, generating for display an indication that a portion of the media asset, corresponding to the unconsumed content remaining in the media asset, is available for download to a second device

FIG. 6

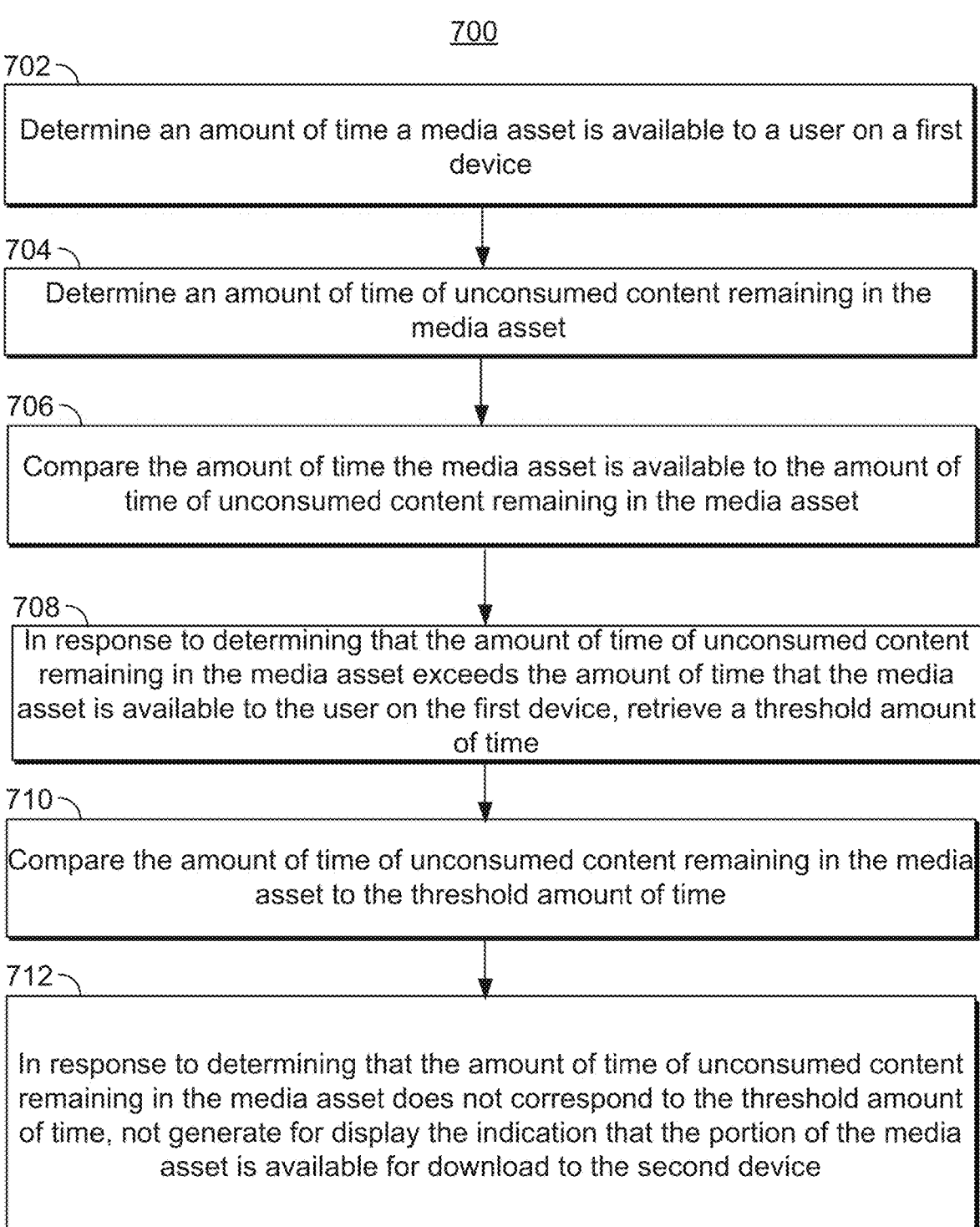

700

702

Determine an amount of time a media asset is available to a user on a first device

704

Determine an amount of time of unconsumed content remaining in the media asset

706

Compare the amount of time the media asset is available to the amount of time of unconsumed content remaining in the media asset

708

In response to determining that the amount of time of unconsumed content remaining in the media asset exceeds the amount of time that the media asset is available to the user on the first device, retrieve a threshold amount of time

710

Compare the amount of time of unconsumed content remaining in the media asset to the threshold amount of time

712

In response to determining that the amount of time of unconsumed content remaining in the media asset does not correspond to the threshold amount of time, not generate for display the indication that the portion of the media asset is available for download to the second device

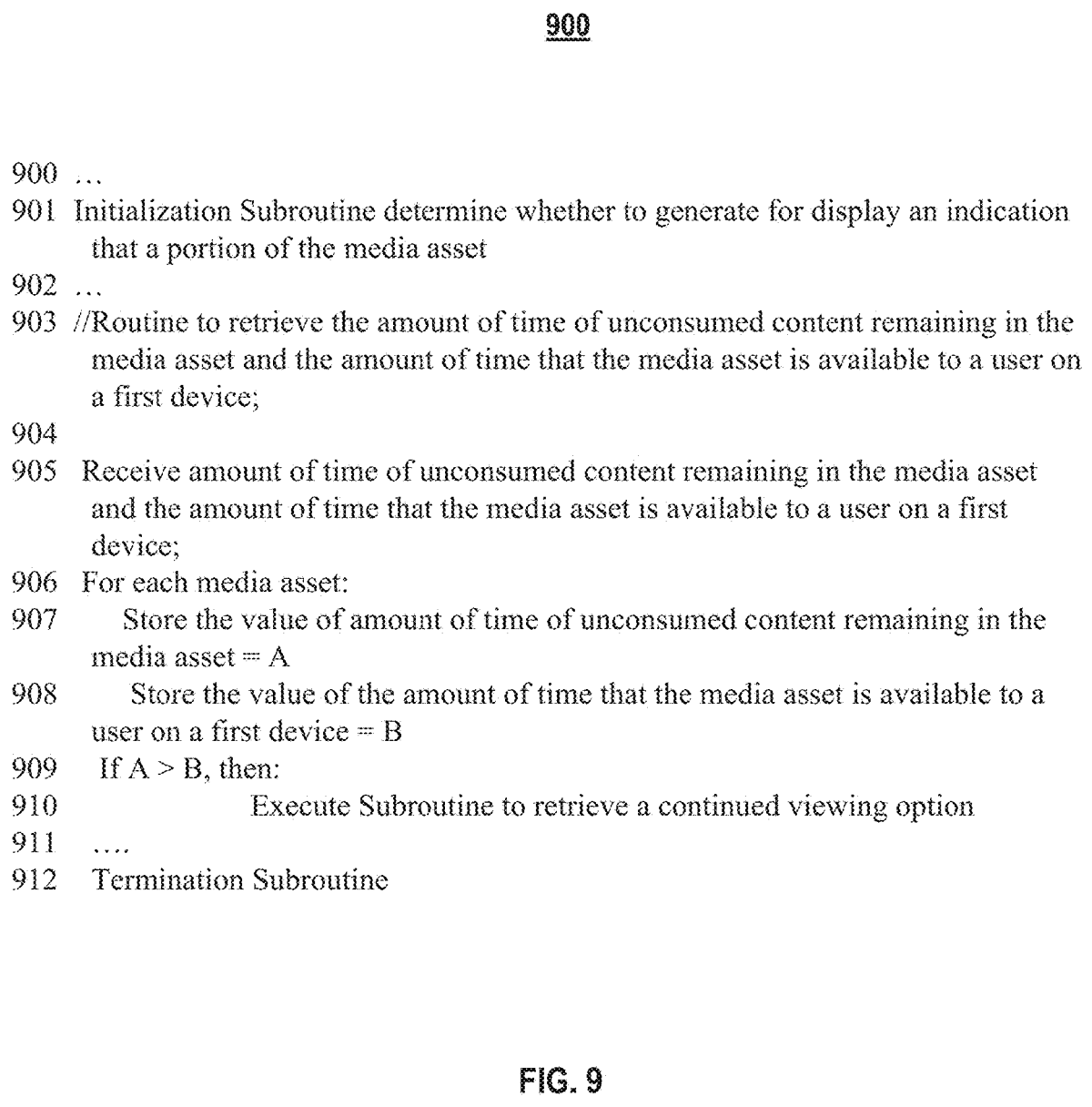

901 Initialization Subroutine determine whether to generate for display an indication that a portion of the media asset

902 ...

903 //Routine to retrieve the amount of time of unconsumed content remaining in the media asset and the amount of time that the media asset is available to a user on a first device;

904

905 Receive amount of time of unconsumed content remaining in the media asset and the amount of time that the media asset is available to a user on a first device;

906 For each media asset:

907     Store the value of amount of time of unconsumed content remaining in the media asset = A 908     Store the value of the amount of time that the media asset is available to a user on a first device = B 909   If A > B, then:

910         Execute Subroutine to retrieve a continued viewing option

911   ....

912   Termination Subroutine

FIG. 9

METHODS AND SYSTEMS FOR ALERTING USERS REGARDING AVAILABILITY OF UNCONSUMED CONTENT

CROSS-REFERENCE TO RELATED APPLICATION

This application is a continuation of U.S. patent application Ser. No. 17/858,264, filed Jul. 6, 2022, which is a continuation of U.S. patent application Ser. No. 17/234,110, filed Apr. 19, 2021, now U.S. Pat. No. 11,412,055, which is a continuation of U.S. patent application Ser. No. 16/654, 923, filed Oct. 16, 2019, now U.S. Pat. No. 11,019,165, which is a continuation of U.S. patent application Ser. No. 15/196,938, filed Jun. 29, 2016, now U.S. Pat. No. 10,484, 494, which are hereby incorporated by reference herein in their entirety.

BACKGROUND

In conventional systems, users have a plethora of media content at their disposal. Furthermore, given advances in technology, users are able to consume content on devices on which they previously could not. For example, users may access media on one or more mobile (e.g., smartphones, tablets, etc.) or stationary (e.g., televisions) devices. Thus, users may access content from virtually anywhere.

Despite this plethora of media content, users' consumption of this media content (whether on a mobile or stationary device) may be interrupted based on the circumstances of the user or the provider of the content. For example, some media content may only be available to a user from a provider during a specific time period (e.g., during the remainder of a flight) or on a particular device (e.g., a stationary video player of an airplane). Accordingly, despite the ability of users to access content from virtually anywhere, users may not be able to, due to restrictions placed on the content by content providers.

In many cases, the restrictions placed on content providers are done so in order to prevent unauthorized sharing of content. For example, content providers may wish to limit access to content to only a single device or for a specific time period in order to prevent one authorized user from sharing the content with numerous unauthorized users. For example, if authorized users are able to share content with unauthorized users, the total number of authorized users (e.g., that paid a content provider for the content) may be reduced.

SUMMARY

Accordingly, methods and systems are described herein for a media guidance application that limits the incentive for authorized users to share content with unauthorized users, while still allowing users to access unconsumed content virtually anywhere. Specifically, the media guidance application allows an authorized user to receive only a portion of a media asset that he or she is authorized to access on a different device, after a designated time period, and/or when the remaining portion of the media asset is inaccessible. More specifically, the media guidance application may only allow the authorized user to access a portion constituting unconsumed content. For example, as only the portion of the media asset, which he or she is authorized to access on a different device, after a designated time period, and/or when the remaining portion of the media asset is inaccessible, is available, the incentive of the user to share that portion with unauthorized users is reduced.

In some aspects, the media guidance application alerts users regarding availability of unconsumed content. The media guidance application may generate for display a media listing for a media asset. For example, the media listing may be a selectable listing that allows a user access or authorization to access the media asset. In some embodiments, the media listing may appear alongside other media listings.

The media guidance application may compare an amount of time of unconsumed (e.g., unwatched, unheard, unread, etc.) content remaining in the media asset and an amount of time that the media asset is available to a user on a first device. For example, the media guidance application may determine the amount of time of unconsumed content remaining in the media asset and may determine the amount of time the media asset is available to the user on the first device. In some embodiments, the amount of time the media asset is available to the user on the first device may be based on a length of a subscription to a content provider that provides the media asset (e.g., a monthly subscription, a one-time use subscription such as a pay-per-view movie, a one-device only subscription such as a stationary video player on an airplane, etc.), a battery-life of the first device (e.g., the amount of battery-life left in the first device will not be enough to fully consume the media asset), and/or a scheduling restriction of the user (e.g., the user must stop consuming a media asset due to a prior engagement). Furthermore, in some embodiments, the media guidance application may perform the comparison (and/or any determinations) prior to playback of the media asset and/or during playback of the media asset. For example, the media guidance application may prompt a user to select a media listing by informing the user that unconsumed portions of the media asset will be available later or on a different device. Alternatively or additionally, the media guidance application may continually monitor the progress of the user to inform them of whether or not he or she will finish the media asset (or whether the unconsumed portion will need to be consumed later or on a different device).

In response to determining that the amount of time of unconsumed content remaining in the media asset exceeds the amount of time that the media asset is available to the user on the first device, the media guidance application may generate for display an indication that a portion of the media asset, corresponding to the unconsumed content remaining in the media asset, is available for download to a second device. For example, in response to determining that the user may not be able to consume the entirety of the media asset, the media guidance application may allow the user to access the unconsumed portion on a second device. In some embodiments, the indication may be simultaneously displayed with the media listing (e.g., in order to prompt the user to select the media asset for playback as discussed above).

In some embodiments, the media guidance application may, in response to a user selection of the indication, a subsequent user request, and/or the end of a period of accessibility, extract the portion of the media asset that is not consumed and transmit (e.g., to another component of the device upon which the media guidance application is implemented, to the second device, and/or to a third device (e.g., a web server) an instruction to create a new media asset featuring only the portion of the media asset. For example, the new media asset may then be available for download to the second device (e.g., from the web server).

In some embodiments, the media guidance application may wish to limit when a portion of the media asset may be available on a second device. For example, if a substantial portion of the media asset is available on the second device, the disincentive to share the media asset is decreased. Likewise, if only a factor of the media asset (e.g., a few minutes or frames), or only a portion that the user is unlikely to wish to view remains unconsumed (e.g., the end credits) the media guidance application may determine to not allow a user to access the portion on another device.

For example, in response to determining that the amount of time of unconsumed content remaining in the media asset exceeds the amount of time that the media asset is available to the user on the first device, the media guidance application may retrieve a threshold amount of time (e.g., indicating the minimum or maximum amount of unconsumed content that triggers subsequent access to the portion of the media asset that is unconsumed). The media guidance application may compare the amount of time of unconsumed content remaining in the media asset to the threshold amount of time and in response to determining that the amount of time of unconsumed content remaining in the media asset does not correspond to (e.g., exceeds the threshold minimum or exceeds the threshold maximum) the threshold amount of time, not generating for display the indication that the portion of the media asset is available for download to the second device.

It should be noted that the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 6 is a flowchart of illustrative steps for generating for display an indication that a portion is available for download to a second device in accordance with some embodiments of the disclosure;

FIG. 7 is a flowchart of illustrative steps for comparing the amount of time of unconsumed content remaining in the media asset to a threshold amount of time in accordance with some embodiments of the disclosure;

FIG. 9 shows an illustrative example of pseudocode for determining whether to generate for display an indication that a portion of the media asset, corresponding to the unconsumed content remaining in the media asset, is available for download to a second device in accordance with some embodiments of the disclosure.

DETAILED DESCRIPTION OF THE DRAWINGS

Figure 1:
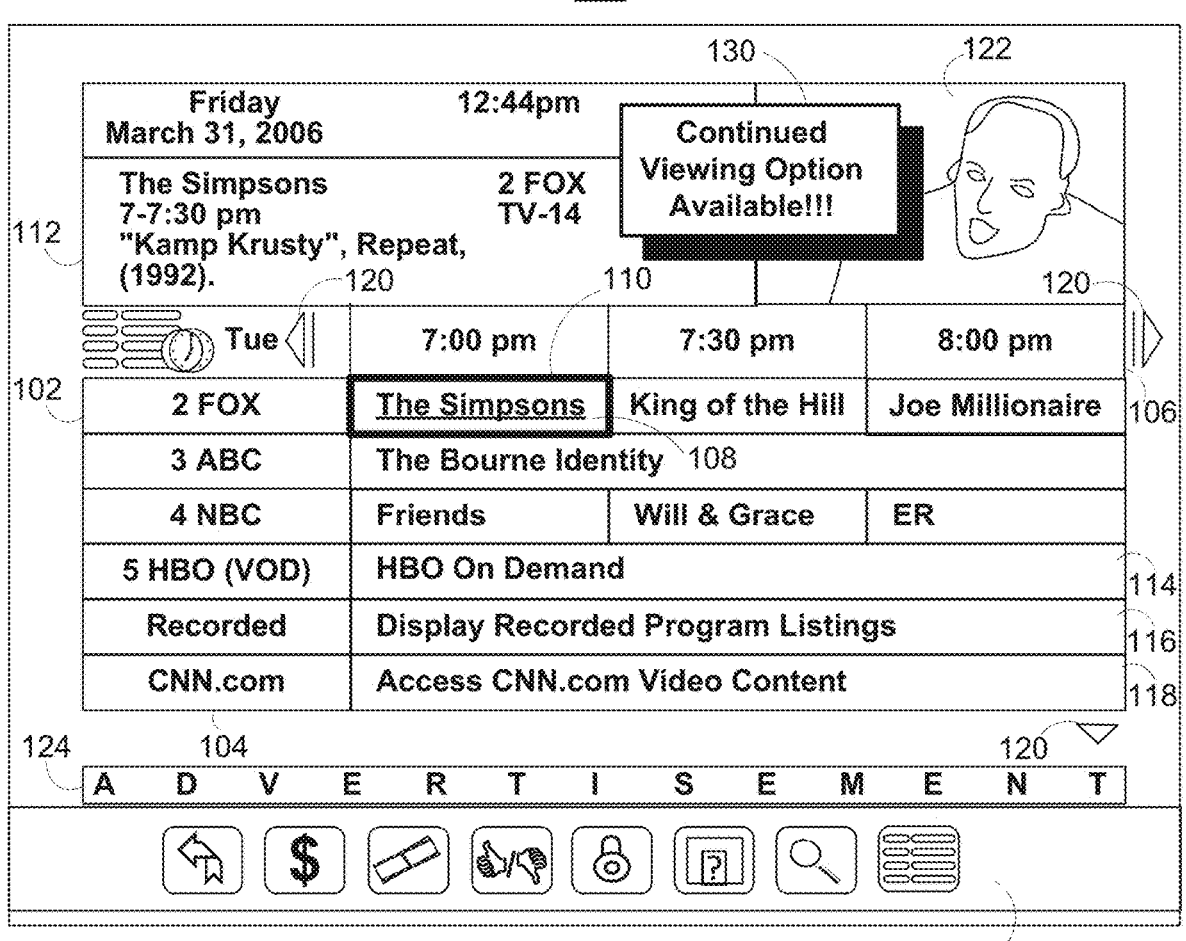
FIG. 1 shows an illustrative example of a display screen for use in performing media guidance application operations in accordance with some embodiments of the disclosure.

Methods and systems are described herein for a media guidance application that limits the incentive for authorized users to share content with unauthorized users, while still allowing users to access content virtually anywhere. Specifically, the media guidance application allows an authorized user to receive only a portion of a media asset that he or she is authorized to access on a different device, after a designated time period, and/or when the remaining portion of the media asset is unaccessible.

As referred to herein, a "media guidance application," "interactive media guidance application," or "guidance application" refers to an application that provides an interface that allows users to efficiently navigate content selections and easily identify content that they may desire.

Media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same.

As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

In some embodiments, the media guidance application may also perform media guidance application operations. As referred to herein, a "media guidance application operation" refers to any operation corresponding to providing, receiving, and/or generating media guidance data for consumption by a user. For example, media guidance application operations include displaying media guidance data, providing options to navigate, select, and edit media guidance data or content (e.g., a media asset) associated with media guidance data, and/or manipulating a device used to access (e.g., a display device), retrieve (e.g., a server), and/or associate media guidance data with a user (e.g., a user device for monitoring brain activity). It should be noted that any embodiment featuring one media guidance application operation (e.g., a fast-access playback operation) may also be applied to any other media guidance application operation.

Other operations of a media guidance application are playing media assets and providing fast access playback operations for those media assets. As referred to herein, the phrase "fast-access playback operations" should be understood to mean any media guidance application operation that pertains to playing back a non-linear media asset faster than normal playback speed or in a different order than the media asset is designed to be played, such as a fast-forward, rewind, skip, chapter selection, segment selection, skip segment, jump segment, next segment, previous segment, skip advertisement or commercial, next chapter, previous chapter or any other operation that does not play back the media asset at normal playback speed. The fast-access playback operation may be any playback operation that is not "play," where the play operation plays back the media asset at normal playback speed.

Still other operations of the media guidance application may include the control of devices used to consume media assets. For example, a media guidance application operation may include turning a device on and off, raising the volume associated with a device, adjusting the display settings of a device, assigning parental controls, transferring information from one device to another, storing and/or recording content, entering authorization information and/or payment information, etc.

Still other operations of the media guidance application may include continued viewing options." As referred to herein, "continued viewing options" include options to download, request credit for unviewed content, request extensions to a period of accessibility, or any other operations that allows a user to access a media asset, or a portion of a media asset, on a different device, after a designated time period, and/or when the remaining portion of the media asset is inaccessible.

Throughout this disclosure some embodiments discuss sharing a media asset, or sharing an authorization to access a media asset, on multiple devices. It should be noted that content (e.g., a media asset) generated for display on a first device may correspond to content (e.g., the same media asset) generated for display on a second device even though the content on each device is not identical (e.g., different formats, lengths, versions, compatibilities, etc.). For example, a media guidance application may generate for display authorization data with a high definition media asset (e.g., on a high definition television) that authorizes the user to access the high definition media asset (e.g., or one or more versions of the media asset, such as a standard definition version of the media asset) on a second user device (e.g., a smartphone).

Alternatively, in some embodiments, sharing a media asset, or sharing an authorization to access a media asset, on multiple devices may be related to a single copy of a media asset. For example, the media guidance application may authorize multiple devices to access a single copy of a media asset stored at a particular repository. In such cases, the media guidance application may authorize only a single device to access the copy of the media asset at one time. Alternatively or additionally, the media guidance application may create a copy of the particular copy of the media asset for simultaneous display on multiple devices.

In some embodiments, access to the media asset or supplemental content is determined according to one or more authorization terms. As referred to herein, an "authorization term" is any condition, criterion, or schedule, whether or not related to a particular contract, agreement, offer, or purchase, that sets limitations, or grants rights, regarding access to the media asset or supplemental content. For example, an authorization term may relate to a length of time that the media asset may be accessed, a number of times that the media asset may be accessed, a user authorized to access the media asset, an account authorized to access the media asset, a type of second user device that may access the media asset, etc.).

In some embodiments, one authorization term may be dependent on another authorization term. For example, an authorization term may indicate a length of time, or a particular modification of a determined length of time, to allow a user to access a media asset based on whether or not a user accesses the media asset on a particular user device, a number of times that a user accesses the particular the media asset, etc. For example, an authorization term (or authorization terms) may include that a user may access a media asset two times and/or for two weeks.

It should be noted that in embodiments discussed throughout this disclosure "a length of time" may be measured in any temporal unit (e.g., seconds, minutes, days, years, etc.). In addition, a length of time may include the length of time that is required for the performance of one or more events. For example, the length of time may relate to the length of time that a user takes to access the media asset, a length of time that a media asset is available at one or more storage locations, or the length of time necessary for a triggering event to occur (e.g., for a user to completely view the entire media asset).

In some embodiments, authorization data may correspond to user selections of terms. For example, the media guidance application may receive a first user request to access a media asset (e.g., a user request to order or select the media asset from a list of available media assets) on a first user device in accordance with one or more authorization terms (e.g., a length of time that the media asset may be accessed, a number of times that the media asset may be accessed, a user authorized to access the media asset, an account authorized to access the media asset, a type of second user device that may access the media asset, etc.). The media guidance application may then select authorization terms that authorize the user to access the media asset in accordance with the one or more authorization terms.

In some embodiments, one or more authorization terms may be included in authorization data. As referred to herein, "authorization data" is any data that indicates, includes, communicates, codifies, or represents one or more authorization terms or otherwise facilitates the sharing of authorization to access a media asset between multiple devices. For example, authorization data may indicate to a repository of media assets whether or not a user and/or user device is authorized to access a media asset based on one or more authorization terms. In some embodiments, a media guidance application may determine the authorization terms associated with the authorization data and compare the terms to status information (e.g., the current data, the number of times a user has already accessed the media asset, etc.) to determine whether or not authorization to the media asset corresponds to the authorization terms (e.g., a predetermined length of time or number of times to access the media asset).

In some embodiments, the media guidance application may generate authorization data that includes the authorization terms of the user access, the media asset to be accessed, and any other information that the media guidance application and/or one or more user devices may require. For example, the media guidance application may retrieve the authorization data from a database of authorization data based on an identifier in the media asset, in which the authorization data authorizes the user to access the media asset on a second user device in accordance with the one or more authorization terms. For example, in response to identifying a media asset, the authorization terms, and/or the account, device or user associated with the authorization, the media guidance application may determine appropriate authorization data.

It should be noted that while in some embodiments described herein authorization data is subject to a cross-reference with a database, embodiments in which the authorization data is not subject to a cross-reference with a database may also be used. For example, the authorization data received may be complete any may indicate the authorization terms without additional processing. In such cases, the authorization data (and/or the media guidance application) does not require access to a database.

As referred to herein, "a media identifier" may refer to any information used to distinguish a media asset from other media assets. For example, a media identifier may include, but is not limited to, a serial number, title, description, etc. The media guidance application may also receive user identifiers, user device identifiers, and/or account identifiers. For example, the one or more authorization terms may restrict (or grant) access to the media asset for particular users, devices, or accounts. In such cases, user identifiers, user device identifiers, or account identifiers, which refer to any information used to distinguish a user, device, or account from other users, devices, or accounts, respectively, may also be received (e.g., via user input) or determined automatically by the media guidance application.

In some embodiments, the authorization data may be continually updated by the media guidance application. For example, the media guidance application may update the authorization data to indicate a playback position in the media asset that corresponds to the viewing progress of the user. As the user continues to view the media asset (i.e., as the playback position progresses), the media guidance application may update the authorization data to indicate this progress. Accordingly, if the media asset is displayed on a second user device, the media asset may be generated for display on a second user device at the current playback position of the user.

In some embodiments, the authorization data may be continually updated by the media guidance application based on the one or more authorization terms. For example, the media guidance application may determine access to the media asset on the second user device is no longer in accordance with the one or more authorization terms (e.g., the rental period associated with the media asset has expired), and the media guidance application may remove the authorization data from simultaneous display with the media asset in response to determining that access to the media asset on the second user device is no longer in accordance with the one or more authorization terms.

Furthermore, in some embodiments, the media guidance application may update the authorization data based on subsequent user actions. For example, a user may receive additional or modified access to a media asset in response to paying an extra fee. In such cases, the media guidance application may adjust or modify the authorization data associated with and/or presented to the user. The modified authorization data may then be presented to a user (e.g., in a media asset). Alternatively or additionally, the authorization data (as modified) may be stored in an online account or profile associated with the user.

Upon determining the proper authorization data, the media guidance application may generate for display the authorization data simultaneously with the media asset. For example, the authorization data may be embedded in the media asset such that, while the authorization data may be detectable by a user device (e.g., a smartphone capturing an image or screenshot of the media asset with the embedded authorization data), the authorization data is not perceivable by a user (e.g., such that the presentation of the authorization data is distracting to the user).

In some embodiments, the media guidance application may notify the user that the authorization data is being presented, has been generated, and/or has been transmitted to another device by generating for display an indication. In some embodiments, authorization data may itself constitute an indication (e.g., if it appears on screen). For example, the authorization data may appear as an on-screen barcode (e.g., which may be decoded to indicate the one or more authorization terms).

For example, the media guidance application may generate for display authorization data that is perceivable to a user, even if the particular authorization terms associated with the authorization data are not perceivable (e.g., an on-screen barcode). As used herein, "a barcode" is an optical machine-readable representation of one or more authorization terms relating to the media asset with which the barcode is associated. Furthermore, barcodes as described herein may include barcodes representing data by varying the widths and spacings of parallel lines (e.g., one-dimensional barcodes) or barcodes representing data using rectangles, dots, hexagons and other geometric patterns (e.g., two-dimensional barcodes).

Authorization data and/or barcodes representing authorization data may be encoded and decoded by the media guidance application to encode and decode the one or more authorization terms using various languages, symbologies, codes or other tests such as edge determination, minimum reflectance, symbol contrast, minimum edge contrast, modulation, defects, decodability, unused error correction, fixed pattern damage, grid non-uniformity, axial non-uniformity, etc.

Whether perceivable to a user or not, the media guidance application may generate for display authorization data that may be communicated to another device by the other device scanning or reading the authorization data and/or barcode representing the authorization data using the techniques and tests discussed above and/or comparing the readings to an encryption key and/or other standard. In some embodiments, scanning or reading the authorization data and/or barcode representing the authorization data may occur by capturing an image, screen shot, or other data associated with the media asset and/or authorization data.

For example, to facilitate the access of the media asset on additional user devices, the media guidance application may present authorization data, which may allow another user device to access the media asset. Moreover, the authorization data may be embedded or presented with the media asset such that a user may easily obtain the authorization data (e.g., by capturing an image of the media asset in which the authorization data is embedded or presented).

For example, in some embodiments, the media guidance application may receive an additional user request to generate for display the media asset on a second user device. For example, the media guidance application may receive a second user request to access a media asset on a second user device, in which the second user request includes an image (e.g., captured via a content capture component associated with the second user device) of the authorization data simultaneously displayed with the media asset on a first user device. The media guidance application may then cross-reference the image with the database of authorization data (or the decoded data associated with the authorization data) to determine the one or more authorization terms. For example, the authorization data may represent the encoded one or more authorization terms. To determine the one or more authorization terms, the media guidance application may decode the authorization data.

The media guidance application may then process the one or more authorization terms to determine whether the one or more authorization terms authorize the media asset to be accessed on the second user device. For example, the one or more authorization terms may indicate whether or not the user (or second user device) is granted access to the media asset. The media guidance application may then generate for display the media asset on the second user device in response to determining whether the one or more authorization terms authorize the media asset to be accessed on the second user device. For example, in response to determining that the user (or second user device) is authorized to access the media asset, the media guidance application may generate for display the media asset on the second user device and/or another user device selected by the user.

The media guidance application may then process the one or more authorization terms to determine whether the one or more authorization terms authorize the supplemental content to be accessed on the second user device, and generate for display the media asset on the second user device in response to determining whether the one or more authorization terms authorize the supplemental content to be accessed on the second user device.

It should be noted, that in some embodiments, user, device, and/or account identifiers may all identify a single entity. Therefore, embodiments related to the identification of a particular user may also be applied to the identification of a particular device and/or account and vice versa. For example, a device may be associated with a particular user or account. Likewise, an account may be associated with a particular user or device. For example, a user may be associated with a particular account such as a social network or other on-line account. The media guidance application may further retrieve a user and/or devices associated with the social network account from a user profile associated with the account.

In some embodiments, a media guidance application operation may include receiving information from a particular source (e.g., a website, a profile associated with a user, a content provider, a social media network, etc.) for use in determining information about media content, determining a portion of a media content subject to an operation (e.g., unconsumed content), determining the availability of content, extracting content, providing extracted content, etc.

For example, the media guidance application may retrieve a list of friends (e.g., a social network buddy list), contacts (e.g., retrieved from a phone/text message/e-mail account associated with the user), and/or other listings featuring other entities with known associations to the user and obtain information about media content such as what portions, if any, were important to one or more plotlines of the media content, what portions were interesting (or not interesting), what portions may be skipped or fast-forwarded through, what content should be included in a supplemental download of a portion of media content (e.g., whether an unconsumed portion was not consumed due to limited access or disinterest by a user). The media guidance application may compare these portions to unconsumed content remaining in a media asset to determine whether or not to provide the unconsumed content to the user later or on a different device.

As used herein, a "social network" refers to a platform that facilitates networking and/or social relations among people who, for example, share interests, activities, backgrounds, and/or real-life connections. In some cases, social networks may facilitate communication between multiple user devices (e.g., computers, televisions, smartphones, tablets, etc.) associated with different users by exchanging content from one device to another via a social media server. As used herein, a "social media server" refers to a computer server that facilitates a social network. For example, a social media server owned/operated/used by a social media provider may make content (e.g., status updates, microblog posts, images, graphic messages, etc.) associated with a first user accessible to a second user that is within the same social network as the first user. In such cases, classes of entities may correspond to the level of access and/or the amount or type of content associated with a first user that is accessible to a second user.

In some embodiments, the media guidance application may retrieve information that indicates the availability of media content. As described herein, the "availability" of media content relates to whether or not a user may consume media content at a given time. The availability may be based on terms (e.g., subscription and/or use terms) of a provider of the media content, based on issues (such as connectivity) associated with obtaining the media content, based on circumstances of the user (e.g., the schedule of the user), based on circumstances of a user device (e.g., battery life, software and/or hardware compatibility issues, etc.), and/or based on any other factor that may determine whether or not a user can access media content at a given time.

In some embodiments, the availability of media content may be described as an availability window. As referred to herein, an "availability window" is a period of time, whether contiguous or non-contiguous, at which a user may access the media content. For example, an availability window may include a period of time when a provider of the media content allows a user to access the content or when a user is able to access the media content. For example, the availability window may be expressed as a range of dates (e.g., beginning on a first date and ending on a second date) or may be expressed relative to one or more dates. For example, the availability window may be expressed as any date before, after, or on a threshold date.

In some embodiments, the media guidance application may notify and recommend action be taken (e.g., providing continued viewing options) in response to determining that the availability of media content may end before a user finishes consuming the media content.

For example, if the media content is only available to a user from a provider during a specific time period (e.g., during the month of August), and the media guidance application determines, given the current viewing progress of the user, that the user is unlikely to finish the media content (e.g., an episode of a program series or the entire program series) during the time period, the media guidance application may alert the user and/or recommend one or more corrective actions such as a continued viewing option. In another example, a mobile device of a user may need Internet connectivity to present media content, and the media guidance application may determine that connectivity issues may arise at a predetermined time (e.g., based on prior history of use). The media guidance application may determine whether or not media content currently being consumed by the user will be completed prior to the time of limited connectivity. If not, the media guidance application may alert the user and/or recommend one or more corrective actions.

In yet another example, a mobile device of a user may be low on battery power, and the media guidance application may determine that the mobile device will exhaust its power at a predetermined time (e.g., based on battery usage rates). The media guidance application may determine whether or not media content currently being consumed by the user will be completed prior to the power exhaustion. If not, the media guidance application may alert the user and/or recommend one or more corrective actions. Finally, in another example, despite content being available to a user, the schedule of the user may indicate a time at which the user can no longer consume the media content. The media guidance application may determine whether or not media content currently being consumed by the user will be completed prior to that time. If not, the media guidance application may alert the user and/or recommend one or more corrective actions.

Additionally or alternatively, the media guidance application may provide supplemental content (e.g., a portion of the remaining media asset constituting unconsumed content, textual summary, highlight clips, etc.) regarding the portion of the media asset that was unconsumed. As used herein, "supplemental content" refers to any content related to media content that supplements a current presentation of the media content with information related to the portion of the media content that was unconsumed. Supplemental content may include content featuring audio, video, and/or textual data associated with one or more portions of the media content. For example, the supplemental content may describe the content or context of the portion of the media content that was not consumed. In some embodiments, the supplemental content may be available during, before, or after a user selection of the indication, a subsequent user request, and/or the end of a period of availability. For example, while a media listing for the media asset is displayed, the media guidance application may overlay an indication of the unconsumed content being available later or on a different device.

As used herein, a "portion" of the media content refers to the section of the media content between two points of playback of media content. It should be noted that, in some embodiments, a portion of media content may span one or more individual media assets. For example, a portion may include a frame, a scene, a chapter, an episode, a season, or any other division of media content. As used herein, a "point of playback" refers to a finite instance in the playback of media content. Media content may include one or more points of playback during its play length. For example, if the media content is a video, a point of playback may refer to a particular frame of the video.

In some embodiments, the media guidance application may track a viewing progress of a user through a series of media content, in which the series of media content has an availability window. As used herein, a "viewing progress" refers to a current point of playback of the user and/or any portion of the media content into which that point of playback may fall. For example, the viewing progress of the user may include a particular frame or minute mark of media content or may refer to a particular portion (e.g., a scene, episode, etc.). To determine the viewing progress of the user, the media guidance application may employ one or more user profiling techniques.

For example, the media guidance application may continually monitor the point of playback of a user through media content. As used herein, a "series of media content" refers to media content that is related to a predetermined sequence. For example, a series of media content may include one or more media assets (e.g., episodes) a serial program. In another example, a series of media content may refer to one or more seasons of a serial program. In yet another example, a series of media content may refer to one or more series of programs (e.g., a program and related spin-off programs) that include common characters, plotlines, or circumstances that evolve in a serial nature.

The media guidance application may use one or more techniques for monitoring the viewing progress of a user and/or determine what portion, if any, of a media asset was not consumed. For example, the media guidance application may use active monitoring (e.g., polling and/or querying the user as to whether or not the user has viewed a portion of media content) or passive monitoring (e.g., determining a user has viewed a portion of media content without polling and/or querying the user). For example, the media guidance application may track the current point of playback and store the last known point of playback of the media content.

In some embodiments, the media guidance application may also update the viewing progress of a user to reflect received user inputs. For example, if the last known point of playback stored by the media guidance application occurs during the third episode in a series, and the user selects to view the fifth episode of the series, the media guidance application may update the viewing progress of the user such that the viewing progress now reflects that the current point of playback is in the fifth episode of the series.

Accordingly, it should be noted that the viewing progress of the user may reflect that the user has fast-forwarded through, skipped over, or otherwise not consumed a portion of the media asset. Furthermore, it should also be noted that "completing" or "finishing" media content does not necessarily require that the user viewed or played back all portions of the media content. For example, completing or finishing media content refers to the subjective opinion of the user and whether or not the user is satisfied that the portion or portions of the media content viewed or played back constitutes the entire media content. For example, a user may have completed consuming media content when the user no longer wishes to view any more portions of the media content whether or not all portions of the media content have actually been viewed (or been determined to have been viewed by the media guidance application). For example, a user may complete media content if the user has viewed the most recently released portion (e.g., episode) of a series of media content even if there are previous portions that the user has not viewed. In another example, the user may complete a media asset (e.g., an episode of serial programming) even if the user has not viewed the media asset in its entirety (e.g., the user did not view the end credits associated with the media asset).

In some embodiments, the media guidance application may further determine whether or not a user has completed a portion of media content based on the percentage of the portion consumed or the content of the portion that was consumed. For example, the media guidance application may determine whether or not the user has viewed a threshold amount (e.g., eighty percent, ninety percent, etc.) of the portion for the media guidance application to consider the portion to have been viewed. Alternatively or additionally, the media guidance application may determine that the user has viewed the substantive part of the portion (e.g., the body of the episode) and that the user does not need to view the non-substantive part of the portion (e.g., the end credits) for the media guidance application to consider the portion to have been viewed.

In some embodiments, the media guidance application may estimate a date of completion of the series of media content based on the viewing progress of the user. It should be noted that the "date" of completion may refer to any unit of time. For example, the date may refer to a specific month, day, hour, minute, etc.

To estimate the date of completion, the media guidance application may use any suitable mathematic calculation such as dividing the amount of remaining media content to be viewed (as measured in any suitable unit (e.g., minutes of media content remaining, episodes of media content remaining, seasons of media content remaining, etc.)) by the rate at which a user views the media content (e.g., average based on a user viewing history) to determine the amount of time (e.g., measured in the same units as the amount of remaining media content) required to complete the media asset.

In some embodiments, the media guidance application may calculate the variables in terms of a viewing session. As used herein, a "viewing session" refers to a period of time characterized by the user's consumption of one or more portions of the media content. For example, a viewing session may include typical temporal measurements (e.g., a month, week, day, etc.) or may refer to particular instances when the user consumes the media content.

For example, the user may "binge-watch" portions of media content. For example, the media guidance application may detect that the user typically watches several episodes or seasons of media content in a short period of time. Accordingly, to estimate the data of completion, the media guidance application may determine the average number of portions of the media content consumed during a binge-watching viewing session and divide the number of portions of the media content remaining to determine the number of viewing sessions that will be required to complete the media content. The media guidance application may then determine the frequency at which the user conducts the viewing sessions to determine a date at which the media content will be completed. Based on the current date, and rate of viewing sessions, the media guidance application may estimate a completion date of the media content.

For example, the media guidance application may determine a rate at which the user consumes the series of media content as well as determine a length of the series of media content. The media guidance application may then determine, given the rate at which the user consumes the series of media content and the length of the series of media content, an amount of time required to consume the entire length of the series of media content, and add the amount of time required to consume the entire length of the series of media content to a current date.

The media guidance application may determine whether the date of completion corresponds to the availability window as discussed above. For example, the media guidance application may determine whether or not the estimated date of completion falls within the time period during which the media content is available. In such cases, the media guidance application may determine whether or not the estimated date of completion is included within the range of dates associated with the availability window. In another example, the media guidance application may determine that the availability window corresponds to the release of a new media content related to already released media content. For example, the media guidance application may determine that the user wishes to consume complete already-released media content (e.g., previous seasons of a television program) before new media content is released (e.g., before the start of the new season of the television program). In such cases, the media guidance application may determine whether or not the estimated date of completion before or on a date associated with the release of the new media content. For example, the series of media content may correspond to a program series with a finite number of released episodes, and the date of completion may correspond to a date when the viewing progress of the user includes an episode, of the finite number of released episodes, that was most recently released.

In response to determining that the date of completion does not correspond to the availability window, the media guidance application may recommend an action to accelerate the viewing progress of the user. For example, the media guidance application may recommend an action (e.g., corresponding to any media guidance application operation discussed above) that accelerates the viewing progress of the user by advancing a current point of playback in the series of media content to a later point of playback in the series of media content. For example, in response to determining that the user will not finish a movie given the current playback position of the user, the media guidance application may recommend that the user fast-forward or skip over a portion of the movie such that the user may finish the movie.

In some embodiments, the availability of media content may be keyed to a current trip of a user (e.g., in order to entertain the user while the user is travelling). In such cases, the media guidance application may monitor the media content to determine whether or not the user will complete the media content based on the availability window, which corresponds to the length of the current trip. In some embodiments, the media guidance application may determine an amount of time remaining in a current trip of a user. As used herein, a "current trip" of a user refers to a distinctive movement of a user defined by a travel itinerary. As used herein, a "travel itinerary" refers to a description of the circumstances and/or progress of a current trip of a user. For example, a travel itinerary may include numerous details associated with the travel itinerary, including, but not limited to, the location of departure and/or arrival (e.g., including, but not limited to, the geographical location, entry/exit requirements, customs and/or activities associated with the location, things to do, cultural elements and/or attractions, etc.), length of travel (e.g., including, but not limited to, time and/or distance spent travelling, time spent at one or more locations, etc.), time of departure and/or arrival (e.g., including any time zone changes), anticipated stops (e.g., layovers), route (e.g., either currently taken or expected to take), of the current trip of the user. In addition, details associated with the travel itinerary may include activities or occurrences that occur before or after a current trip. For example, a business meeting scheduled a day after the end of a current trip (e.g., as indicated by a calendar application associated with the user) may be related to the current trip (e.g., a user was travelling to the business meeting).

For example, in some embodiments, the travel itinerary describes, including, but not limited to, the destination of a current trip, the route of a current trip, and the length of time associated with the current trip. For example, the media guidance application may use the travel itinerary of the current trip of the user to determine that the user will be traveling for four hours.

In some embodiments, a current trip may be divided into one or more sub-trips, and the media guidance application may determine length associate For example, a trip may include with each sub-trip. several different sub-trips defined by different modes of transportation (e.g., a car ride to an airport, an airplane flight to a different city, a bus ride to a hotel, etc.). In another example, sub-trips may be defined by different destinations (e.g., an airplane flight to one city, a layover at the city, a second airplane flight to a different city, etc.).

Throughout this disclosure, embodiments and examples are discussed with reference to various methods and modes of transportation. It should be noted that any embodiments described herein with reference to one method or mode of transportation may also be applied to another mode of transportation. For example, an embodiment or example describing the use of a media guidance application in relation to an airplane (or any other method or mode of transportation) may also be applied to a cruise ship, bus, train, car, motorcycle, bicycle, etc., or any other method or mode of transportation, whether public or private, and whether powered mechanically (e.g., car, train, etc.), manually (e.g., walking, bicycle, etc.), or powered by any other means (e.g., horse, sailboat, etc.). In addition, the media guidance application monitors for changes in either the determined travel itinerary (e.g., an adjustment of the expected arrival time) or the determined objective.

In order to detect changes and/or updates in either the determined travel itinerary and/or how long a media asset will remain available (e.g., from a stationary video player in an airplane), the media guidance application may incorporate or have access to a detection module that may include various components (e.g., a video detection component, an audio detection component, bio-metric component, etc.). Upon detecting either a change in the travel itinerary or a change in the determined objective, the media guidance application may rectify the playlist based on the change.

The media guidance application may also determine an amount of time remaining in a media asset and/or media content being consumed by the user during the current trip. For example, the media guidance application may determine an amount of time between a current point of playback (e.g., the forty-minute mark) in the media asset and an end point (e.g., the sixty-minute mark in an hour-long media asset) of the media asset.

The media guidance application may compare the amount of time remaining in the current trip to the amount of time remaining in the media asset. For example, the media guidance application may compare the amount of time remaining in the current trip to the amount of time remaining in the media asset to determine whether or not the user will finish the media asset prior to the end of the current trip.

In response to detecting a discrepancy between the amount of time remaining in the current trip and the amount of time remaining in the media asset, the media guidance application may provide a continued viewing option to rectify the discrepancy. As used herein, a "discrepancy" refers to a situation in which the amount of time remaining in the current trip is not enough time to consume the media asset and/or media content.

In some embodiments, the time remaining in the current trip may not necessarily refer to the arrival of a user at his or her destination, and instead refer to a period at which the user will no longer be able to consume the media asset and/or media content. For example, during an airplane flight, the user may need to turn off a user device upon which the user is viewing a media asset prior to actually landing. The media guidance application may incorporate such limitations when determining the amount of time remaining in the current trip. Likewise, the media guidance application may determine that a user may lose connectivity (e.g., when connectivity is necessary to view a media asset) at a particular portion of the current trip (e.g., when entering an underground tunnel). Accordingly, the media guidance application may incorporate such limitations when determining the amount of time remaining in the current trip and/or break the trip into a number of sub-trips.

It should also be noted that any embodiment discussed herein referring to the completion of a media asset or media content may also be applied to the completion of a portion of the media asset and/or media content. For example, the media guidance application may break media content into various portions and assign the various portions to individual sub-trips of the current trip. The media guidance application may then determine whether or not a particular portion assigned to a sub-trip will be completed by the end of the sub-trip. If not, the media guidance application may recommend actions described herein.

In some embodiments, the media guidance application may generate on-screen icons, menus, overlays, or options featuring recommended actions to be performed. In some embodiments, the media guidance application uses non-visual indications such as audio announcements. For example, the media guidance application may generate for display an overlay featuring various options for fast-forwarding, skipping a portion of the media asset, etc. Additionally, the media guidance application may generate for display summary information, as discussed above, associated with a portion of the media asset subject to the fast-access playback operation.

In some embodiments, the media guidance application may also monitor the progress of the current trip of the user (e.g., as discussed below in relation to FIG. 3). For example, the media guidance application may receive updates to the travel itinerary. In response to determining a change in the determined travel itinerary, the media guidance application may recalculate the amount of time remaining in the current trip. After recalculating the amount of time remaining in the current trip, the media guidance application may recommend, if any, different fast-access playback operations.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a website), or as stand-alone applications or clients on user equipment devices. Various devices and platforms that may implement media guidance applications are described in more detail below.

Figure 2:
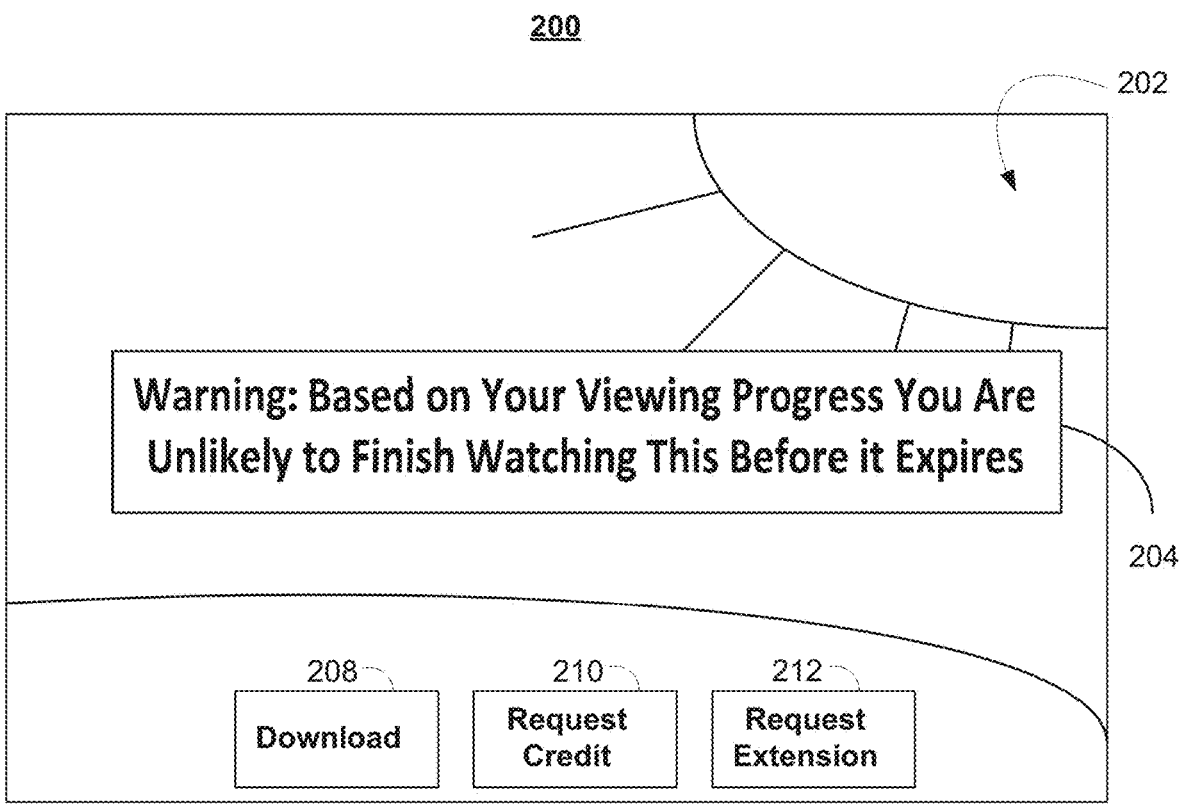
FIG. 2 shows another illustrative example of a display screen used to provide continued viewing options to the user with regards to media content in accordance with some embodiments of the disclosure.

FIGS. 1-2 show illustrative display screens that may be used to provide media guidance data such as continued viewing options. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

Furthermore, the media guidance application may provide indication 130 that indicates that a media listing is associated with a continued viewing option. As referred to herein, "an indication" includes any audio, video, or textual data that conveys to a user a continued viewing option (e.g., the ability to download unconsumed content at a later date or on a different device) is available.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. In some embodiments, an advertisement may relate to, or advertise, a continued viewing option and/or the fact that a media asset is associated with a continued viewing option. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/ or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Display 200 includes media asset 202. For example, in response to determining that media asset 202 will not be completed during the availability window associated with media asset 202, the media guidance application has generated indication 204 and options 208, 210, and 212.

For example, the media content may only be available for another thirty minutes, and the media guidance application determines, given the current viewing progress of the user, that the user is unlikely to finish the media content within the thirty minutes. For example, the media guidance application may determine that media asset 202 has forty minutes remaining in its play length. In another example, a mobile device upon which display 200 may require Internet connectivity to present media asset 202, and the media guidance application may determine that connectivity issues may arise at a predetermined time shortly. For example, the media guidance application may determine (e.g., based on the travel itinerary) that a user will be travelling outside the range of its Internet provider carrier shortly.

The media guidance application may also determine that the mobile device upon which media asset 202 is being presented has only ten minutes of power remaining, and thus will not be able to finish presenting media asset 202. Likewise, a calendar function incorporated into, or accessible by, the media guidance application may determine that a user will need to stop viewing media asset 202 in twenty minutes due to a previously scheduled appointment.

Accordingly, the media guidance application has notified the user via indication 204 and has recommended actions (e.g., options 208, 210, and 212) to allow the user to complete the media content. For example, the media guidance application has provided recommendations for downloading unconsumed content (e.g., option 208), requesting a credit for unconsumed content (e.g., option 210), and requesting an extension of time to view unconsumed content.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature polysilicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

User equipment device 300 may also incorporate or be accessible to detection module 316. Detection module 316 may further include various components (e.g., a video detection component, an audio detection component, etc.) for determining and/or detecting changes to information about the travel itinerary. In some embodiments, detection module 316 may include components that are specialized to generate particular information. For example, detection module 316 may include components for use in detecting and/or retrieving information about a user and/or the actions and/or activities of the user.

In some embodiments, detection module 316 may include an audio/video detection component, which determines or receives information describing objects in images and/or noise emanating from a user or other sources (e.g., a public address announcement related to a user's travel itinerary in an airport or airplane). Additionally or alternatively, the audio detection component may monitor for images and/or sounds originating from other sources that may be related to a user's current trip or travel itinerary. In some embodiments, the audio/video detection component includes one or more sensors that transmit data to processing circuitry 306, which determines a change and/or update to a user's travel itinerary.

For example, detection module 316 may include one or more content-recognition modules, which may be used by the media guidance application to analyze information received from a content capture device (e.g., video and/or audio recorder). For example, the media guidance application may include an object recognition module. The object recognition module may use edge detection, pattern recognition, including, but not limited to, self-learning systems (e.g., neural networks), optical character recognition, on-line character recognition (including, but not limited to, dynamic character recognition, real-time character recognition, intelligent character recognition), and/or any other suitable technique or method to determine the objects in and/or characteristics of video and audio recordings. For example, the media guidance application may receive a media asset in the form of a video (e.g., an audio/video recording of travel announcements and in-flight instructions). The video may include a series of frames. For each frame of the video, the media guidance application may use an object recognition module to determine the characteristics associated with each frame (or the media assets as a whole) of the video to determine information related to the travel itinerary, a change to the travel itinerary, a portion of unconsumed content, etc.

In some embodiments, the content-recognition module or algorithm may also include audio analysis and speech recognition techniques, including, but not limited to, Hidden Markov Models, dynamic time warping, and/or neural networks (as described above) to process audio data and/or translate spoken words into text. The content-recognition module may also use any other suitable techniques for processing audio and/or visual data. For example, the content-recognition module may analyze audio data to determine whether or not a user is talking. Furthermore, the content-recognition module may analyze video and/or audio data to determine changes to a user's travel itinerary, a change to the travel itinerary, etc.

In addition, the media guidance application may use multiple types of optical character recognition and/or fuzzy logic, for example, when comparing multiple data fields (e.g., as contained in databases described below). For example, after the content-recognition module or algorithm translates video and/or audio recordings into text, the media guidance application (e.g., via control circuitry 304) may cross-reference the translated text with a database (e.g., located at storage 308 or media guidance data source 418 (FIG. 4)) to determine whether or not the translated text corresponds to data associated with a user's travel itinerary, a change to the travel itinerary, etc.

For example, the media guidance application may arrange the text into data fields and cross-reference the data fields with other data fields (e.g., in a lookup table database) corresponding to possible values associated with a user's travel itinerary, a user status change, and/or objective. Using fuzzy logic, the system may determine two fields and/or values to be identical, even though the substance of the data field or value (e.g., two different spellings) is not identical. In some embodiments, the system may analyze particular data fields of a data structure or media asset frame for particular values or text. The data fields could be associated with characteristics, other data, and/or any other information required for the function of the embodiments described herein. Furthermore, the data fields could contain values (e.g., the data fields could be expressed in binary or any other suitable code or programming language).

In some embodiments, detection module 316 may include a Global Positioning System ("GPS") detection component, which determines or receives information describing the geographic position of a user. For example, the GPS detection component may, additionally or alternatively, determine whether or not the user is taking a particular route (e.g., whether or not the current position of a user corresponds to a position in the route), is on schedule (e.g., whether or not the current position of a user corresponds to the position the user is scheduled to be at in the route based on the current time), or the current travelling speed of the user. In some embodiments, the GPS detection component includes one or more sensors that transmit data to processing circuitry 306, which determines a change and/or update to a user's travel itinerary, a change to the travel itinerary, etc.

In some embodiments, detection module 316 may include an Internet access component, which determines or receives information describing the current trip retrieved over the Internet. For example, the Internet access component may, additionally or alternatively, determine whether or not information on the Internet (e.g., a website of an airline) indicates a change or update to the determined travel itinerary or the determined objective of the user. Additionally or alternatively, detection module 316 may include a vehicle access component, which determines or receives information (e.g., from the odometer of a car) describing the current trip retrieved from the vehicle. For example, the media guidance application may be configured to receive information from the flight control system of an airplane. In some embodiments, the Internet access component and vehicle access component may transmit data to processing circuitry 306, which determines a change and/or update to a user's travel itinerary, a user status, and/or objective.

For example, detection module 316 may access and/or receive commands from systems and/or data associated with the method or mode of transportation. For example, detection module 316 may receive specific inputs from the media control system associated with the method or mode of transportation (e.g., an airline IFE system). Furthermore, the media guidance application may incorporate information and/or commands. For example, during a flight, detection module 316 may incorporate pilot/flight attendant announcements, flight/navigation equipment signals, and/or data collected on previous flights to determine a travel itinerary, a change to the travel itinerary, etc.

The guidance application may be implemented using any suitable architecture. For example, it may be a stand-alone application wholly implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 3:
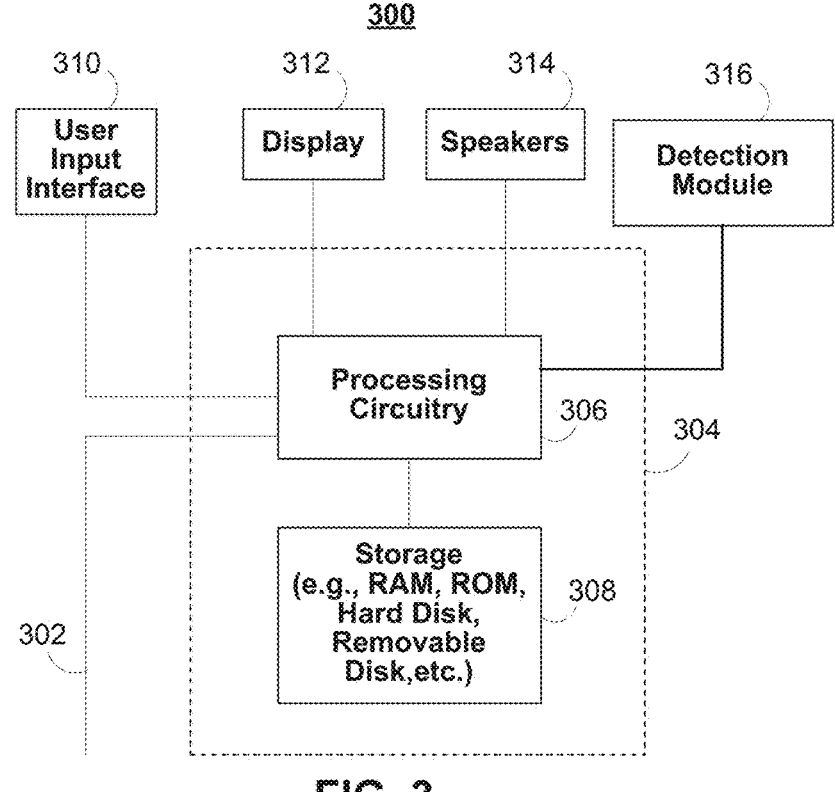
FIG. 3 is a block diagram of an illustrative user equipment device in accordance with some embodiments of the disclosure.
Figure 4:
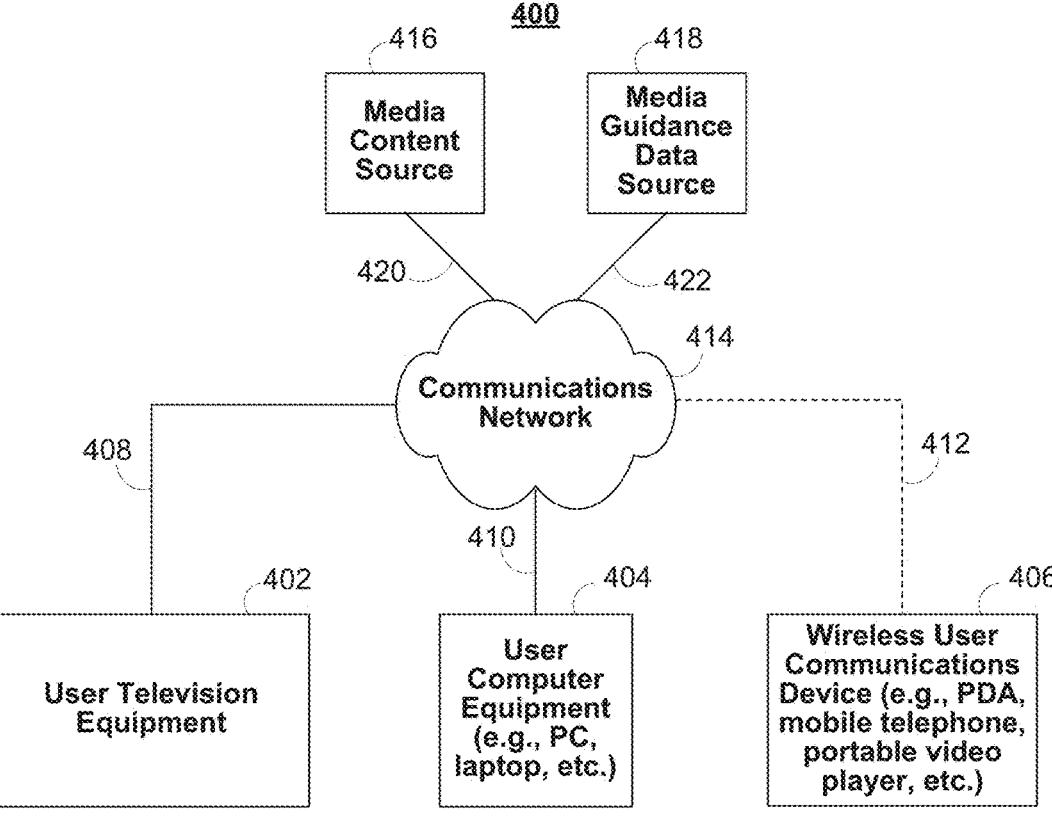
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood that a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
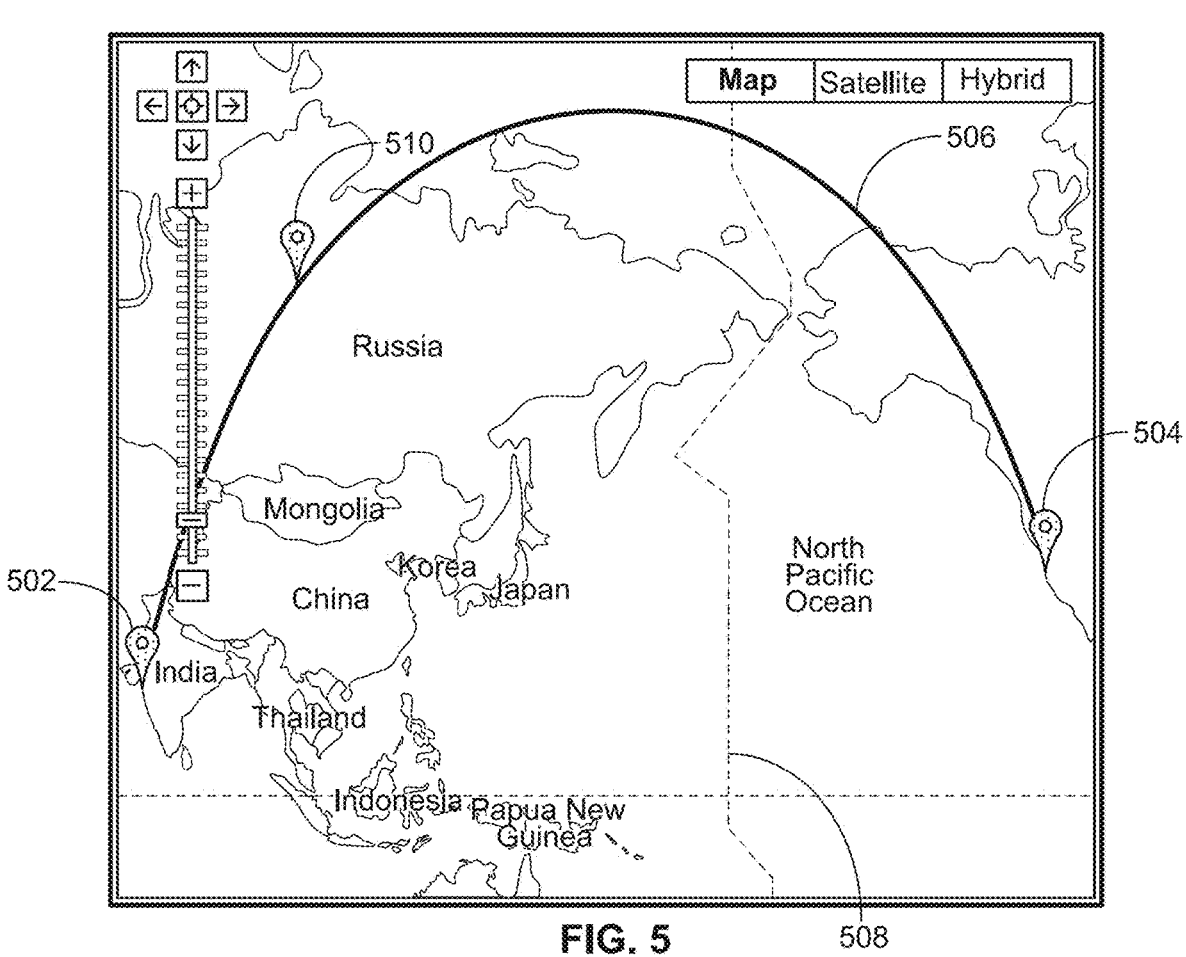
FIG. 5 is a diagram describing a travel itinerary associated with a current trip of a user in accordance with some embodiments of the disclosure.

FIG. 5 is a diagram describing a travel itinerary associated with a current trip of a user. It should be noted that display 500 is illustrative only and should not be taken to be limiting in any manner. For example, in some embodiments, one or more of the features of display 100 and/or display 200 may be incorporated into display 500. Display 500 may appear on the display (e.g., display 312 (FIG. 3)) of a user equipment device (e.g., user equipment device 402, 404, and/or 406 (FIG. 4)). Furthermore, in some embodiments, display 500 may receive inputs via user input interface 310 (FIG. 3) and/or receive data via I/O path 302 (FIG. 3)).

Display 500 shows a graphical display of a travel itinerary associated with the current trip of the user. For example, display shows destination location 502 and departure location 504. Display 500 also includes travel route 506 and current position 510 as well as additional display information 508 (e.g., an International Date Line, times zone changes, municipal borders, etc.). The media guidance application may use such information for determining whether or not the amount of time of unconsumed content remaining in the media asset exceeds the amount of time that the media asset is available to the user on the first device.

In some embodiments, the media guidance application determines destination location 502, departure location 504, travel route 506, and/or current position 510 based on various sources (e.g., user input interface 310 and/or detection module 316 (FIG. 3)). For example, the media guidance application may receive user inputs (e.g., via user input interface 310 (FIG. 3)) into a display (e.g., display 500 (FIG. 5)) to determine one or more of destination location 502, departure location 504, travel route 506, current position 510, and/or any other information related to the travel itinerary (e.g., travel speed, refueling stops, layover lengths, etc.).

In some embodiments, the media guidance application may determine one or more of destination location 502, departure location 504, travel route 506, current position 510, and/or any other information related to the travel itinerary without user input (e.g., via detection module 316 (FIG. 3)). For example, to determine the length of time of a current trip, the media guidance application may receive information from the airline (e.g., via accessing a website associated with the airline or receiving an e-mail or other information from the airline). The media guidance application may additionally or alternatively receive route and length of trip information from Internet sources (e.g., retrieved via I/O path 302 (FIG. 3)) that provide maps, directions, and/or other features for planning trips, while monitoring the current position of the user using retrieved GPS data (e.g., using detection module 316 (FIG. 3)).

In some embodiments, the media guidance application may retrieve destination location 502, departure location 504, travel route 506, current position 510 and/or any other information related to the travel itinerary from a database. For example, the media guidance application may determine the destination (e.g., destination location 502) of a current trip of a user. In addition, the media guidance application may determine the current position (e.g., current position 510) and speed of the user (e.g., via detection module 316 (FIG. 3)). The media guidance application may further determine the route (e.g., travel route 506) from the current position of the user to the destination by cross-referencing a database related to route information. For example, the media guidance application may incorporate or have access to a local (e.g., located at storage 308 (FIG. 3)) or remote (e.g., located at media content source 416 (FIG. 4)), media guidance data source 418 (FIG. 4), and/or a device/location accessible via communications network 414 (FIG. 4)) database (e.g., a lookup table) in which the media guidance application may input the destination and current position to determine the shortest and/or quickest route.

Furthermore, in some embodiments, the media guidance application may compute (e.g., via processing circuitry 306 (FIG. 3)) the destination location 502, departure location 504, travel route 506, current position 510 and/or any other information related to the travel itinerary based on mathematical computations involve other characteristics of the travel itinerary. For example, having determined the distance to the destination (e.g., destination location 502) from the current position of a user (e.g., current position 510), the route (e.g., travel route 506), and/or speed of travel from one or more of the methods described above, the media guidance application may apply suitable mathematical operations (e.g., dividing the distance by the speed to determine the length of time remaining in the current trip) to determine any other information related to the travel itinerary.

In some embodiments, display 500 may correspond to a media asset, or content displayed in conjunction with, a media asset displayed in vehicle or on a user device (e.g., a smartphone) provided by a third party (e.g., a common carrier) for use by the user in monitoring the progress of his or her current trip. For example, in some embodiments, in response to a user selection (e.g., via user interface 310 (FIG. 3)) requesting that media content be completed during the current trip of the user, the media guidance application may be receiving information (e.g., airplane schedule, train schedule, bus schedule, etc.) indicating the travel itinerary of the user. Furthermore, in some embodiments, the media guidance application may receive user inputs (e.g., via user input interface 310 (FIG. 3)) of one or more criteria (e.g., destination location 502, departure location 504, travel route 506, and/or current position 510) in order for the media guidance application to update a determined travel itinerary of the user to determine an availability window associated with the current trip and/or the amount of time remaining in the current trip of the user. Alternatively or additionally, the media guidance application may continuously and/or automatically retrieve data provided by a third party related to the travel itinerary or changes to the travel itinerary to determine the availability window of length of time remaining in the current trip.

For example, based on the current position of the user (e.g., as determined by detection module 316 (FIG. 3)), information received via user input interface 310 (FIG. 3), mathematical computations of processing circuitry 306 (FIG. 3), and/or information received from a cross-reference with a database located at storage 308 (FIG. 3), media content source 416 (FIG. 4), media guidance data source 418 (FIG. 4), and/or a device/location accessible via communications network 414 (FIG. 4)), the media guidance application may determine an availability window associated with the current trip and/or the amount of time remaining in the current trip of the user based on real-time data such that changes to the travel itinerary (e.g., delays) may be accounted for.

FIG. 6 is a flowchart of illustrative steps for generating for display an indication that a portion is available for download to a second device. It should be noted that process 600 or any step thereof could be performed on, or provided by, any of the devices shown in FIGS. 3-4. For example, process 600 may be executed by control circuitry 304 (FIG. 3) as instructed by a media guidance application implemented on a user device (e.g., user equipment devices 402, 404, and/or 406 (FIG. 4)) in order to generate for display an indication that a portion is available for download to a second device. In addition, one or more steps of process 600 may be incorporated into or combined with one or more steps of any other process or embodiment (e.g., as described in relation to FIGS. 7-9)).

At step 602, the media guidance application generates for display (e.g., via control circuitry 304 (FIG. 3)) a media listing for a media asset. For example, the media listing may be a selectable listing that allows a user access or gain authorization to access the media asset. In some embodiments, the media listing may appear alongside other media listings.

At step 604, the media guidance application compares (e.g., via control circuitry 304 (FIG. 3)) an amount of time of unconsumed (e.g., unwatched, unheard, unread, etc.) content remaining in the media asset and an amount of time that the media asset is available to a user on a first device. For example, the media guidance application may determine (e.g., via control circuitry 304 (FIG. 3)) the amount of time of unconsumed content remaining in the media asset and may determine (e.g., via control circuitry 304 (FIG. 3)) the amount of time the media asset is available to the user on the first device. In some embodiments, the amount of time the media asset is available to the user on the first device may be based on (and/or retrieved from storage 308 (FIG. 3)

and/or any location accessible via communications network 414 (FIG. 4)) a length of a subscription to a content provider that provides the media asset (e.g., a monthly subscription, a one-time use subscription such as a pay-per-view movie, a one-device only subscription such as a stationary video player on an airplane, etc.), a battery-life of the first device (e.g., the amount of battery-life left in the first device will not be enough to fully consume the media asset), and/or a scheduling restriction of the user (e.g., the user most stop consuming a media asset due to a prior engagement). Furthermore, in some embodiments, the media guidance application may perform the comparison (and/or any determinations) prior to play back of the media asset and/or during play back of the media asset. For example, the media guidance application may prompt a user to select a media listing by informing the user that unconsumed portions of the media asset will be available later or on a different device. Alternatively or additionally, the media guidance application may continually monitor the progress of the user to inform them of whether or not he or she will finish the media asset (or whether the unconsumed portion will need to be consumed later or on a different device).

At step 606, in response to determining that the amount of time of unconsumed content remaining in the media asset exceeds the amount of time that the media asset is available to the user on the first device, the media guidance application (e.g., via control circuitry 304 (FIG. 3)) generates for display an indication (e.g., indication 130 (FIG. 1) or indication 204 (FIG. 2)) that a portion of the media asset, corresponding to the unconsumed content remaining in the media asset, is available for download to a second device. For example, in response to determining that the user may not be able to consume the entirety of the media asset, the media guidance application may allow the user to access the unconsumed portion on a second device. In some embodiments, the indication may be simultaneously displayed with the media listing (e.g., in order to prompt the user to select the media asset for play back as discussed above).

In some embodiments, the media guidance application may generate for display the indication in response to detecting authorization data. For example, the media guidance application may authorize another device to access a copy of the media asset, currently being consumed by the user, and stored at a particular repository. In such cases, the media guidance application may authorize the other device to access the copy of the media asset at one time. Alternatively or additionally, the media guidance application may create a copy of the media asset, or a portion of the media asset, for continued viewing on another device.

In some embodiments, the media guidance application may, in response to a user selection of the indication, a subsequent user request, and/or the end of a period of accessibility, extract the portion of the media asset that is not consumed and transmit (e.g., to another component of the device upon which the media guidance application is implemented, to the second device, and/or to a third device (e.g., a web server) an instruction to create a new media asset featuring only the portion of the media asset. For example, the new media asset may then be available for download to the second device (e.g., from the web server).

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 6.

FIG. 7 is a flowchart of illustrative steps for comparing the amount of time of unconsumed content remaining in the media asset to a threshold amount of time. It should be noted that process 700 or any step thereof could be performed on, or provided by, any of the devices shown in FIGS. 3-4. For example, process 700 may be executed by control circuitry 304 (FIG. 3) as instructed by a media guidance application implemented on a user device (e.g., user equipment devices 402, 404, and/or 406 (FIG. 4)) in order to compare the amount of time of unconsumed content remaining in the media asset to a threshold amount of time. In addition, one or more steps of process 700 may be incorporated into or combined with one or more steps of any other process or embodiment (e.g., as described in relation to FIGS. 6 and 8-9)).

The media guidance application may wish to limit when a portion of the media asset may be available on a second device. For example, if a substantial portion of the media asset is available on the second device, the disincentive to share the media asset is decreased. Likewise, if only a factor of the media asset (e.g., a few minutes or frames), or only a portion that the user is unlikely to wish to view remains unconsumed (e.g., the end credits) the media guidance application may determine not to allow a user to access the portion on another device.

For example, in response to determining that the amount of time of unconsumed content remaining in the media asset exceeds the amount of time that the media asset is available to the user on the first device, the media guidance application may retrieve a threshold amount of time (e.g., indicating the minimum or maximum amount of unconsumed content that triggers subsequent access to the portion of the media asset that is unconsumed. The media guidance application may compare the amount of time of unconsumed content remaining in the media asset to the threshold amount of time and in response to determining that the amount of time of unconsumed content remaining in the media asset does not correspond to (e.g., exceeds the threshold minimum or exceeds the threshold maximum) the threshold amount of time, not generating for display the indication that the portion of the media asset is available for download to the second device. It should be noted that one or more threshold may be used.

At step 702, the media guidance application determines (e.g., via control circuitry 304 (FIG. 3)) an amount of time a media asset is available to a user on a first device. For example, the media guidance application may retrieve a term of use, battery life of a device, amount of time remaining in a current trip etc. At step 704, the media guidance application determines (e.g., via control circuitry 304 (FIG. 3)) an amount of time of unconsumed content remaining in the media asset. For example, the media guidance application may retrieve (e.g., from storage 308 (FIG. 3) and/or any device accessible via communications network 414 (FIG. 4)) an amount of currently unwatched content.

At step 706, the media guidance application compares (e.g., via control circuitry 304 (FIG. 3)) the amount of time the media asset is available to the amount of time of unconsumed content remaining in the media asset. For example, as described in relation to FIG. 6, the media guidance application may determine (e.g., via control circuitry 304 (FIG. 3)) the amount of time of unconsumed content remaining in the media asset and may determine (e.g., via control circuitry 304 (FIG. 3)) the amount of time the media asset is available to the user on the first device.

In some embodiments, the amount of time the media asset is available to the user on the first device may be based on (and/or retrieved from storage 308 (FIG. 3) and/or any location accessible via communications network 414 (FIG. 4)) a length of a subscription to a content provider that provides the media asset (e.g., a monthly subscription, a one-time use subscription such as a pay-per-view movie, a one-device only subscription such as a stationary video player on an airplane, etc.), a battery-life of the first device (e.g., the amount of battery-life left in the first device will not be enough to fully consume the media asset), and/or a scheduling restriction of the user (e.g., the user must stop consuming a media asset due to a prior engagement).

Furthermore, in some embodiments, the media guidance application may perform the comparison (and/or any determinations) prior to play back of the media asset and/or during play back of the media asset. For example, the media guidance application may prompt a user to select a media listing by informing the user that unconsumed portions of the media asset will be available later or on a different device. Alternatively or additionally, the media guidance application may continually monitor the progress of the user to inform them of whether or not he or she will finish the media asset (or whether the unconsumed portion will need to be consumed later or on a different device).

At step 708, in response to determining that the amount of time of unconsumed content remaining in the media asset exceeds the amount of time that the media asset is available to the user on the first device, the media guidance application retrieves (e.g., via control circuitry 304 (FIG. 3)) a threshold amount of time. For example, the media guidance application may retrieve the threshold amount from storage 308 (FIG. 3) and/or any location accessible via communications network 414 (FIG. 4)). The threshold (e.g., the minimum and/or maximum time, frame, etc.) may be determine by a third party, industry standard, etc.

At step 710, the media guidance application compares (e.g., control circuitry 304 (FIG. 3)) the amount of time of unconsumed content remaining in the media asset to the threshold amount of time. At step 712, the media guidance application generate for display (e.g., via control circuitry 304 (FIG. 3)) the indication that the portion of the media asset is available for download to the second device in response to determining that the amount of time of unconsumed content remaining in the media asset corresponds to the threshold amount of time. Alternatively, the media guidance application does not generate for display (e.g., via control circuitry 304 (FIG. 3)) the indication that the portion of the media asset is available for downloading to the second device in response to determining that the amount of time of unconsumed content remaining in the media asset does not correspond to the threshold amount of time.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 7.

Figure 8:
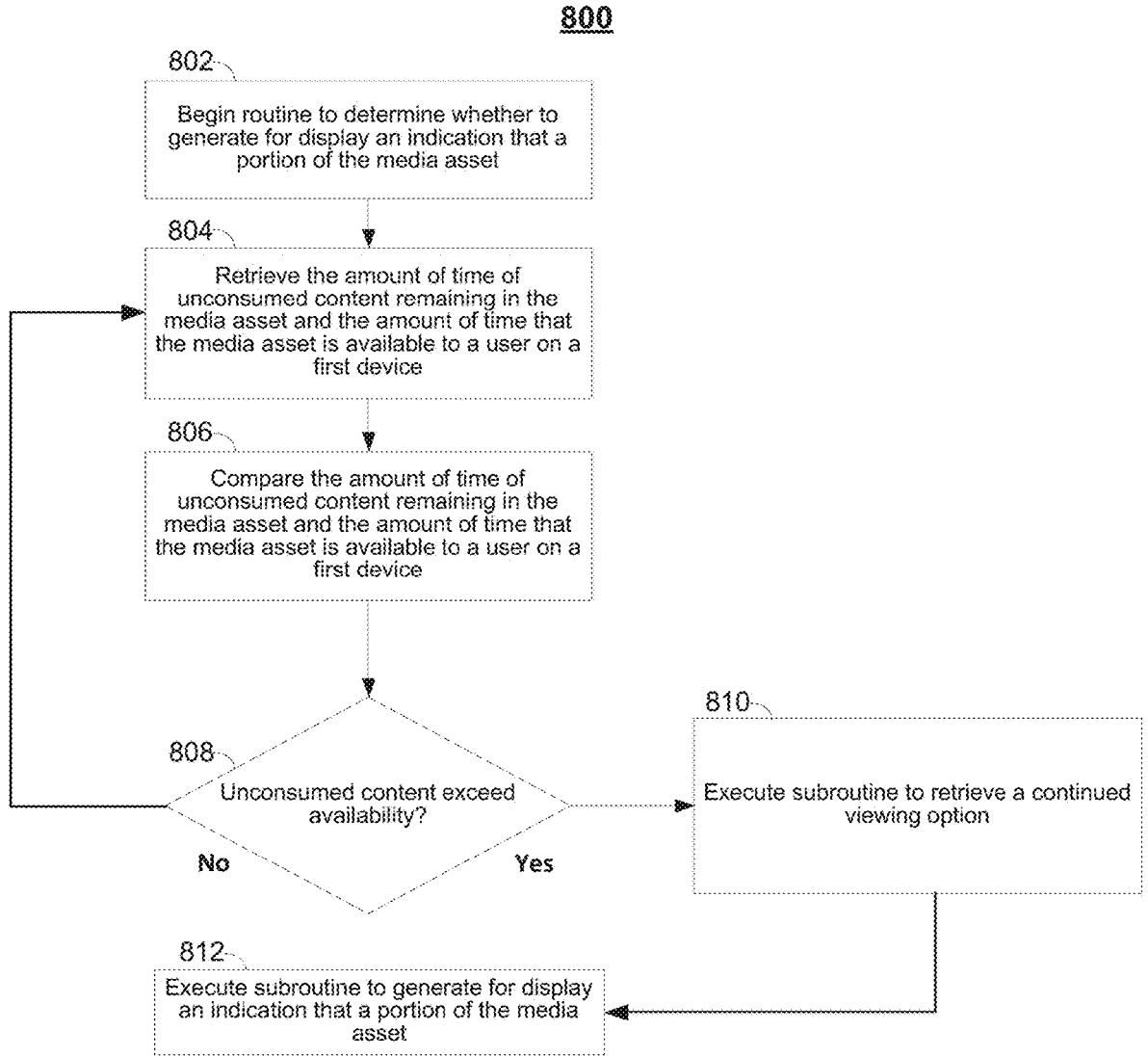
FIG. 8 is a flowchart of illustrative steps for determining whether to generate for display an indication that a portion of the media asset, corresponding to the unconsumed content remaining in the media asset, is available for download to a second device in accordance with some embodiments of the disclosure.

FIGS. 8 and 9 present processes for control circuitry (e.g., control circuitry 304) for determining whether to generate for display an indication that a portion of the media asset, corresponding to the unconsumed content remaining in the media asset, is available for download to a second device. In some embodiments, this algorithm may be encoded on to non-transitory storage medium (e.g., storage device 308) as a set of instructions to be decoded and executed by processing circuitry (e.g., processing circuitry 306). Processing circuitry may in turn provide instructions to other sub-circuits contained within control circuitry 304, such as the tuning, video generating, encoding, decoding, encrypting, decrypting, scaling, analog/digital conversion circuitry, and the like.

The flowchart in FIG. 8 describes a process implemented on control circuitry (e.g., control circuitry 304) to determine whether to generate for display an indication that a portion of the media asset, corresponding to the unconsumed content remaining in the media asset, is available for download to a second device. Process 800 may involve one or more step of FIGS. 6 and 7.

At step 802, control circuitry 304 begins a routine to determine whether to generate for display an indication that a portion of the media asset, corresponding to the unconsumed content remaining in the media asset, is available for download to a second device. In some embodiments, this may be done either directly or indirectly in response to a user action or input (e.g., from signals received by control circuitry 304 or user input interface 310). For example, the process may begin directly in response to control circuitry 304 receiving signals from user input interface 310, or control circuitry 304 may prompt the user to confirm their input using a display (e.g., by generating a prompt to be displayed on display 312) prior to running the algorithm.

At step 804, control circuitry 304 proceeds to retrieve the amount of time of unconsumed content remaining in the media asset and the amount of time that the media asset is available to a user on a first device. In some embodiments, control circuitry 304 may receive a single primitive data structure that represents the value of the next criterion. In some embodiments, the value may be stored as part of a larger data structure, and control circuitry 304 may retrieve the value by executing appropriate accessor methods to retrieve the value from the larger data structure.

At step 806, control circuitry 304 proceeds to compare the amount of time of unconsumed content remaining in the media asset and the amount of time that the media asset is available to a user on a first device. In some embodiments, the value of the difference may be stored (e.g., on storage device 308). In some embodiments, the value of difference may also be retrieved for comparison to one ore more thresholds (e.g., as discussed in relation to FIG. 7)). In some embodiments, control circuitry 304 may directly compare the value of the amount of time of unconsumed content remaining in the media asset and the value of the amount of time that the media asset is available to a user on a first device by accessing the values respectively from memory and performing a value comparison. In some instances, control circuitry 304 may call a comparison function (e.g., for object to object comparison) to compare criteria in the user profile modification and criteria in the user profile.

At step 808, control circuitry 304 compares the value of the amount of time of unconsumed content remaining in the media asset and the amount of time that the media asset is available to a user on a first device to determine if the value of the amount of time of unconsumed content remaining in the media asset exceeds the value of the amount of time that the media asset is available to a user on a first device. If the condition is satisfied (e.g., the user will not be able to consume the remainder of the media asset), process 800 proceeds to step 810; if the condition is not satisfied, process 800 returns to step 804 instead.

At step 810, control circuitry 304 executes a subroutine to retrieve a continued viewing option based on the condition at step 808 being satisfied. After the subroutine is executed, process 800 proceeds to step 812.

At step 812, control circuitry 304 executes a subroutine to generate for display an indication that a portion of the media asset, corresponding to the unconsumed content remaining in the media asset, is available for download to a second device.

It is contemplated that the descriptions of FIG. 8 may be used with any other embodiment of this disclosure. In addition, the descriptions described in relation to the algo-rithm of FIG. 5 may be done in alternative orders or in parallel to further the purposes of this disclosure. For example, conditional statements and logical evaluations, such as those at 808 and 812, may be performed in any order or in parallel or simultaneously to reduce lag or increase the speed of the system or method. As a further example, in some embodiments several instances of the criteria in the user profile modification may be evaluated in parallel, using multiple logical processor threads, or the algorithm may be enhanced by incorporating branch prediction. Furthermore, it should be noted that the process of FIG. 8 may be implemented on a combination of appropriately configured software and hardware, and that any of the devices or equipment discussed in relation to FIGS. 3-4 could be used to implement one or more portions of the process.

The pseudocode in FIG. 9 describes a process to generate for display an indication that a portion of the media asset, corresponding to the unconsumed content remaining in the media asset, is available for download to a second device. It will be evident to one skilled in the art that the process described by the pseudocode in FIG. 9 may be implemented in any number of programming languages and a variety of different hardware, and that the style and format should not be construed as limiting, but rather a general template of the steps and procedures that would be consistent with code used to implement some embodiments of this disclosure.

At line 901, control circuitry 304 initializes a subroutine to determine whether to generate for display an indication that a portion of the media asset, corresponding to the unconsumed content remaining in the media asset, is avail-able for download to a second device, which begins on line 905. At line 903, control circuitry 304 runs a routine to retrieve the amount of time of unconsumed content remain-ing in the media asset and the amount of time that the media asset is available to a user on a first device. For example, in some embodiments control circuitry 304 may copy instruc-tions from non-transitory storage medium (e.g., storage device 308) into RAM or into the cache for processing circuitry 306 during the initialization stage. Additionally, in some embodiments the value of a threshold amount of time, used for comparison, or a tolerance level for determining if two values are essentially equivalent, may be retrieved, set, and stored at 901.

At line 905, control circuitry 304 receives the amount of time of unconsumed content remaining in the media asset and the amount of time that the media asset is available to a user on a first device. In some embodiments, these amounts may be retrieved from memory. Control circuitry 304 may receive these amounts by receiving, for example, a pointer to an array of values of amounts in the user profile for various media assets. In another example, control circuitry 304 may receive an object of a class, such as an iterator object containing elements of the various media assets and/or indicator of viewing progress of a user.

At line 906, control circuitry 304 iterates through the various media assets, if only a single instance is available, the loop will only execute once. This loop may be imple-mented in multiple fashions depending on the choice of hardware and software language used to implement the algorithm of FIG. 9; for example, this may be implemented as part of a "for" or "while" loop.

At line 907, control circuitry 304 stores the value of amount of time of unconsumed content remaining in the media asset into a temporary variable "A." In some embodi-ments, the value will be stored as part of a larger data structure or class, and the value may be obtained through appropriate accessor methods. In some embodiments, the value may be converted from a string or other non-numeric data type into a numeric data type by means of an appro-priate hashing algorithm. In some embodiments, control circuitry 304 may call a function to perform a comparison of the value and a threshold. In some embodiments, the thresh-old may be encoded as a primitive data structure, and rather than using a temporary variable, the threshold may be directly used in the comparisons at line 909.

At line 908, control circuitry 304 stores the value of the amount of time that the media asset is available to a user on a first device into a temporary variable "B." Similar to line 907, in some embodiments the value will be stored as part of a larger data structure or class, and the value may be obtained through accessor methods. In some embodiments, value may be converted from a string or other non-numeric data type into a numeric data type by means of an appro-priate hashing algorithm, or the value may be a primitive data structure, and may be directly used in the comparisons at lines 909.

At line 909, control circuitry 304 compares the value of the amount of time of unconsumed content remaining in the media asset and the value of the amount of time that the media asset is available to a user on a first device. For example, the media guidance application compares the value of the amount of time of unconsumed content remaining in the media asset and the amount of time that the media asset is available to a user on a first device to determine if the value of the amount of time of unconsumed content remain-ing in the media asset exceeds the value of the amount of time that the media asset is available to a user on a first device.

At line 910, control circuitry 304 executes a subroutine to retrieve a continued viewing option based on the condition being satisfied. At line 912, control circuitry 304 executes a subroutine to generate for display an indication that a portion of the media asset, corresponding to the unconsumed content remaining in the media asset, is available for down-load to a second device.

At line 912, control circuitry 304 runs a termination subroutine after the algorithm has performed its function. For example, in some embodiments control circuitry 304 may destruct variables, perform garbage collection, free memory or clear the cache of processing circuitry 306.

It will be evident to one skilled in the art that process 900 described by the pseudocode in FIG. 9 may be implemented in any number of programming languages and a variety of different hardware, and the particular choice and location of primitive functions, logical evaluations, and function evalu-ations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments break conditions may be placed after lines 910 and 912 to speed operation, or the conditional statements may be replaced with a case-switch.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
determining that a media asset is being consumed via a first device;
determining a time remaining in a trip;
determining, based on the time remaining in the trip, an unconsumed portion of the media asset, wherein the unconsumed portion of the media asset is a portion of the media asset that likely will not be completed by an end of the trip;
generating a selectable option to download the unconsumed portion of the media asset to a second device distinct from the first device;
enabling, according to receipt of a selection of the selectable option, a download of the unconsumed portion of the media asset to the second device; and
making unavailable for consumption the unconsumed portion of the media asset on the first device after the unconsumed portion of the media asset is downloaded to the second device.

2. The method of claim 1, wherein the unconsumed portion is identified as the portion of the media asset between a last viewed timestamp of the media asset and a final timestamp of the media asset.

3. The method of claim 1, further comprising:
identifying the second device communicatively coupled to receive the download of the unconsumed portion of the media asset.

4. The method of claim 1, wherein the selectable option to download the unconsumed portion of the media asset to the second device is displayed by the first device while the media asset is being consumed via the first device.

5. The method of claim 1, wherein the time remaining in the trip is determined according to an estimated flight arrival time of a vehicle, wherein the first device is communicatively coupled to the vehicle.

6. The method of claim 1, wherein the time remaining in the trip is determined according to a speed of a vehicle, wherein the first device is communicatively coupled to the vehicle.

7. The method of claim 1, wherein the download of the unconsumed portion of the media asset is enabled from the first device to the second device.

8. The method of claim 1, wherein the media asset is consumed via the first device using a first media application, and the unconsumed portion of the media asset is available for consumption on the second device via the first media application.

9. The method of claim 1, wherein the unconsumed portion of the media asset is unavailable on the first device after the end of the trip.

10. A system comprising:
control circuitry configured:
to determine that a media asset is being consumed via a first device;
to determine a time remaining in a trip and to store the time remaining to a memory;
to determine, based on the time remaining in the trip, an unconsumed portion of the media asset, wherein the unconsumed portion of the media asset is a portion of the media asset that likely will not be completed by an end of the trip; and
to generate a selectable option to download the unconsumed portion of the media asset to a second device distinct from the first device; and
a communication port configured to enable, according to receipt of a selection of the selectable option, a download of the unconsumed portion of the media asset to the second device, wherein the system makes unavailable for consumption the unconsumed portion of the media asset on the first device after the unconsumed portion of the media asset is downloaded to the second device.

11. The system of claim 10, wherein the unconsumed portion is identified as the portion of the media asset between a last viewed timestamp of the media asset and a final timestamp of the media asset.

12. The system of claim 10, wherein the system is configured:
to identify the second device communicatively coupled to receive the download of the unconsumed portion of the media asset.

13. The system of claim 10, wherein the selectable option to download the unconsumed portion of the media asset to the second device is displayed by the first device while the media asset is being consumed via the first device.

14. The system of claim 10, wherein the time remaining in the trip is determined according to an estimated flight arrival time of a vehicle, wherein the first device is communicatively coupled to the vehicle.

15. The system of claim 10, wherein the time remaining in the trip is determined according to a speed of a vehicle, wherein the first device is communicatively coupled to the vehicle.

16. The system of claim 10, wherein the download of the unconsumed portion of the media asset is enabled from the first device to the second device.

17. The system of claim 10, wherein the media asset is consumed via the first device using a first media application, and the unconsumed portion of the media asset is available for consumption on the second device via the first media application.

18. The system of claim 10, wherein the unconsumed portion of the media asset is unavailable on the first device after the end of the trip.

* * * * *